US012285860B2

(12) United States Patent
Kastler et al.

(10) Patent No.: US 12,285,860 B2
(45) Date of Patent: Apr. 29, 2025

(54) ARM MODULE FOR A MODULAR ROBOTIC ARM OF AN INDUSTRIAL ROBOT

(71) Applicant: Beckhoff Automation GmbH, Verl (DE)

(72) Inventors: Peter Kastler, Vienna (AT); Clemens Maier, Bludenz (AT); Thomas Morscher, Vienna (AT); Armin Pehlivan, Nüziders (AT); Christoph Zech, Moedling (AT)

(73) Assignee: Beckhoff Automation GmbH, Verl (DE)

( * ) Notice: Subject to any disclaimer, the term of this patent is extended or adjusted under 35 U.S.C. 154(b) by 555 days.

(21) Appl. No.: 17/575,010

(22) Filed: Jan. 13, 2022

(65) Prior Publication Data

US 2022/0134539 A1 May 5, 2022

Related U.S. Application Data

(63) Continuation of application No. PCT/EP2020/070755, filed on Jul. 23, 2020.

(30) Foreign Application Priority Data

Jul. 25, 2019 (DE) .................... 10 2019 120 135.7

(51) Int. Cl.
*B25J 9/08* (2006.01)
*B25J 9/10* (2006.01)
*B25J 19/00* (2006.01)

(52) U.S. Cl.
CPC .................. *B25J 9/08* (2013.01); *B25J 9/102* (2013.01); *B25J 19/0029* (2013.01)

(58) Field of Classification Search
CPC . B25J 9/08; B25J 9/102; B25J 19/0025; B25J 19/0029; B25J 19/0033; B25J 19/0041
See application file for complete search history.

(56) References Cited

U.S. PATENT DOCUMENTS

| | | | |
|---|---|---|---|
| 4,319,772 A | 3/1982 | Weirich et al. | |
| 4,370,091 A | 1/1983 | Gagliardi | |
| (Continued) | | | |

FOREIGN PATENT DOCUMENTS

| | | |
|---|---|---|
| CN | 2735363 Y | 10/2005 |
| CN | 101861234 A | 10/2010 |
| (Continued) | | |

OTHER PUBLICATIONS

English translation of EP 3372354 A1 (Year: 2018).*

(Continued)

*Primary Examiner* — Joseph Brown
(74) *Attorney, Agent, or Firm* — Dorsey & Whitney LLP

(57) ABSTRACT

An arm module has a housing with a first connection side and a second connection side. The first connection side is embodied to be controllably rotatable about an axis of rotation relative to the second connection side. The first connection side has a rotatable first connection device and the second connection side has a second connection device fixed to the housing. A multifunctional rotation transfer system is provided for rotational transmission of data signals, electrical energy and fluid. A drive device is provided comprising a shaft assembly having an output shaft, which is connected to the rotatable first connection device of the first connection side in a torque-proof manner, wherein the shaft assembly forms a section of the multifunctional rotation transfer system.

17 Claims, 14 Drawing Sheets

(56) References Cited

U.S. PATENT DOCUMENTS

| | | | |
|---|---|---|---|
| 4,438,309 | A | 3/1984 | Zimmer |
| 4,655,655 | A | 4/1987 | Schuerfeld |
| 4,990,839 | A | 2/1991 | Schonlau |
| 5,039,193 | A | 8/1991 | Snow et al. |
| 5,056,829 | A | 10/1991 | Kramer |
| 5,069,524 | A | 12/1991 | Watanabe et al. |
| 5,205,701 | A | 4/1993 | Kigami et al. |
| 5,488,215 | A | 1/1996 | Aronsson |
| 5,633,963 | A | 5/1997 | Rickenbach et al. |
| 5,850,762 | A | 12/1998 | Kochanneck |
| 6,084,373 | A | 7/2000 | Goldenberg et al. |
| 6,628,338 | B1 | 9/2003 | Elberbaum et al. |
| 8,786,385 | B1 | 7/2014 | Lorenc |
| 8,845,338 | B2 | 9/2014 | Sirkett et al. |
| 8,909,008 | B1 | 12/2014 | Tzeng et al. |
| 8,978,509 | B2 | 3/2015 | Pan et al. |
| 9,677,602 | B1 | 6/2017 | Baghdasarian |
| 9,751,220 | B2 | 9/2017 | Murphy et al. |
| 9,796,097 | B2 | 10/2017 | Kirihara |
| 10,281,657 | B2 | 5/2019 | Sullivan |
| 10,343,277 | B2 | 7/2019 | Gombert et al. |
| 10,780,575 | B2 | 9/2020 | Reese et al. |
| 10,821,613 | B2 | 11/2020 | Yoshimura et al. |
| 11,413,761 | B2 | 8/2022 | Simkins |
| 2001/0052735 | A1 | 12/2001 | Sakamoto |
| 2008/0118204 | A1 | 5/2008 | Ankerhold |
| 2010/0314376 | A1 | 12/2010 | Zander et al. |
| 2013/0340560 | A1 | 12/2013 | Burridge et al. |
| 2014/0245856 | A1 | 9/2014 | Kirihara et al. |
| 2014/0283642 | A1 | 9/2014 | Harada et al. |
| 2016/0046019 | A1 | 2/2016 | Ryu et al. |
| 2016/0195385 | A1 | 7/2016 | Hoeller et al. |
| 2017/0341228 | A1 | 11/2017 | Ryu et al. |
| 2018/0079080 | A1 | 3/2018 | Kozaki |
| 2018/0111275 | A1 | 4/2018 | Kurek |
| 2018/0169872 | A1 | 6/2018 | Okamoto |
| 2019/0099883 | A1 | 4/2019 | Niu |
| 2019/0168395 | A1 | 6/2019 | Hay et al. |
| 2020/0269417 | A1 | 8/2020 | Riek et al. |
| 2020/0282553 | A1 | 9/2020 | Simkins |
| 2022/0118634 | A1 | 4/2022 | Pfister et al. |
| 2022/0134540 | A1 | 5/2022 | Kastler et al. |
| 2022/0143815 | A1 | 5/2022 | Kastler et al. |

FOREIGN PATENT DOCUMENTS

| | | | | |
|---|---|---|---|---|
| CN | 106541398 | A | 3/2017 | |
| CN | 107466262 | A | 12/2017 | |
| CN | 108858135 | A | 11/2018 | |
| DE | 3717597 | A1 * | 1/1998 | ............ B25J 17/025 |
| DE | 29912409 | U1 * | 9/1999 | ............ B25J 17/00 |
| DE | 102013019869 | A1 | 5/2015 | |
| DE | 202014010032 | U1 | 3/2016 | |
| DE | 202016104373 | U1 | 8/2016 | |
| DE | 102017104319 | A1 | 9/2017 | |
| DE | 102017001943 | A1 | 8/2018 | |
| DE | 102019120116 | A1 | 1/2021 | |
| DE | 102019120128 | A1 | 1/2021 | |
| DE | 102019120131 | A1 | 1/2021 | |
| EP | 0054454 | A1 | 6/1982 | |
| EP | 0221186 | A1 | 5/1987 | |
| EP | 0743143 | A1 | 11/1996 | |
| EP | 0901877 | A2 | 3/1999 | |
| EP | 1123784 | A2 | 8/2001 | |
| EP | 3372354 | A1 | 9/2018 | |
| EP | 3441205 | A2 | 2/2019 | |
| EP | 3476548 | A1 | 5/2019 | |
| WO | 9532078 | A1 | 11/1995 | |
| WO | 9608675 | A1 | 3/1996 | |
| WO | 9901261 | A1 | 1/1999 | |
| WO | 9960667 | A2 | 11/1999 | |
| WO | 2012136645 | A1 | 10/2012 | |
| WO | 2018158097 | A1 | 9/2018 | |
| WO | 2019038221 | A1 | 2/2019 | |
| WO | 2019081662 | A1 | 5/2019 | |
| WO | 2019081662 | A9 | 8/2019 | |
| WO | 2021013912 | A1 | 1/2021 | |
| WO | 2021013994 | A1 | 1/2021 | |
| WO | 2021013995 | A1 | 1/2021 | |

OTHER PUBLICATIONS

English translation of EP 1123784 A2 (Year: 2001).*
Office Action dated Feb. 23, 2024 in connection with Chinese patent application No. 202080053383.2, 8 pages including English translation.
Office Action dated Jul. 12, 2023 in connection with Chinese patent application No. 202080053383.2, 20 pages including English translation.
Office Action dated Nov. 11, 2023 in connection with Chinese patent application No. 202080053383.2, 21 pages including English translation.
"EtherCAT—the Ethernet Fieldbus," Beckhoff Automation GmbH, Nov. 2012, 21 pages., Nov. 1, 2012.
"EtherCAT—the Ethernet Fieldbus," EtherCAT Technology Group, Nov. 2012, 21 pages., Nov. 1, 2012.
Office Action dated Jun. 21, 2022 in connection with Chinese Patent Application No. 202080053862.4, 11 pages including English translation.
Office Action dated Dec. 28, 2022 in connection with Chinese patent application No. 202080053383.2, 9 pages including English translation.
Office Action dated Dec. 28, 2022 in connection with Chinese patent application No. 202080054360.3, 9 pages including English translation.
International Search Report and Written Opinion issued in International Application No. PCT/EP2020/070974, mailed on Nov. 10, 2020, 22 pages including English Translation.
Office Action issued in German Patent Application No. 102019120128.4 issued on Apr. 6, 2020, 11 pages with English translation.
International Search Report and Written Opinion dated Jan. 13, 2021 in connection with International Patent Application No. PCT/EP2020/070755, 27 pages including English translation.
International Search Report and Written Opinion dated Jan. 13, 2021 in connection with International Patent Application No. PCT/EP2020/070972, 35 pages including English translation.
International Preliminary Report on Patentability dated Mar. 4, 2021 in connection with International Patent Application No. PCT/EP2020/070755, 32 pages including English translation.
International Preliminary Report on Patentability dated Jun. 24, 2021 in connection with International Patent Application No. PCT/EP2020/070974, 137 pages including English translation.
International Preliminary Report on Patentability dated Jul. 9, 2021 in connection with International Patent Application No. PCT/EP2020/070754, 24 pages including English translation.
International Preliminary Report on Patentability dated Jul. 27, 2021 in connection with International Patent Application No. PCT/EP2020/070972, 38 pages including English translation.
International Search Report and Written Opinion dated Nov. 5, 2020 in connection with International Patent Application No. PCT/EP2020/070754, 21 pages including English translation.
Office Action dated Dec. 15, 2020 in connection with German patent application No. DE 10 2019 120 116.0, 18 pages including English translation.

* cited by examiner

ARM MODULE FOR A MODULAR ROBOTIC ARM OF AN INDUSTRIAL ROBOT

CROSS-REFERENCE TO RELATED APPLICATIONS

This application is a continuation of International Patent Application PCT/EP2020/070755, filed Jul. 23, 2020 entitled ARM MODULE FOR A MODULAR ROBOTIC ARM OF AN INDUSTRIAL ROBOT, which claims priority to German Patent Application No. DE 10 2019 120 135.7, filed 25 Jul. 2019, entitled ARMMODUL FÜR EINEN MODULAREN ROBOTERARM EINES INDUSTRIEROBOTERS, each of which is incorporated by reference herein, in the entirety and for all purposes.

FIELD

The present invention relates to an arm module for a modular robot arm of an industrial robot. Furthermore, the invention relates to an industrial robot.

BACKGROUND

The technical field of automation technology (implementation, measurement, control/regulation, communication, man/machine interface, safety, etc.) has the object of automating machines incl. industrial robots and/or systems, i.e. to be able to operate them independently and without the involvement of a human being. A degree of automation (ratio of automated production steps to all production steps) in an automation system is higher, the more independent a respective machine in a system and/or a respective system is/are from human intervention.

Goals of automation technology are a relief of humans from dangerous, strenuous and/or monotonous activities, an improvement of a quality by the technical system, a higher efficiency of the system and a cost reduction by the system. Through advances in machines, a signal detection, a signal processing and/or a communication (networking) of components within the automation system, the degree of automation of an existing or a new system may be significantly increased compared to the state of the art.

Application-specific industrial robots (manipulators) are an integral part of automated systems. An industrial robot is a programmable machine for handling, assembling and/or machining workpieces. The industrial robot generally includes a robot base, a robot arm (manipulator) with a plurality of mutually pivoting and/or rotating (angle of rotation limited, possibly slightly larger than about 360°) proximal (toward a robot base) and distal (away from the robot base) arm links, an (end) effector (robot hand, tool, gripper, etc.), a local controller/regulator, and, as the case may be, a global controller/regulator. Frequently, industrial robots are equipped with different sensors. When programmed, the industrial robot is able to autonomously perform a workflow or to change execution of a task depending on information from a sensor.

Arm links that may be pivoted or rotated in relation to one another have a joint mechanical interface, wherein optical signals and/or electrical voltage (control information) as well as electrical energy must be transported beyond the mechanical interface and, if necessary, fluid (gas(es) and/or liquid(s)) must be guided away. For this purpose, drag chains are required to guide the corresponding lines without destroying them. Thereby, arbitrary rotations (rotations) of mutually dependent arm links are not possible. Furthermore, different interfaces mean several manufacturers.

SUMMARY

The invention provides an improved robot arm and an improved industrial robot.

According to first aspect, an arm module for a modular robot arm of an industrial robot comprises a housing having a first connection side and a second connection side, the first connection side being embodied to be controllably rotatable about an axis of rotation relative to the second connection side, the first connection side having a rotatable first connection device and the second connection side having a second connection device fixed to the housing. The arm module further comprises a multifunctional rotation transfer system for a rotation transfer of data signals, of electrical energy and of fluid. The arm module further comprises a drive device with a shaft assembly having an output shaft, the shaft assembly being connected in a rotationally fixed manner to the rotatable first connection device of the first connection side, the shaft assembly forming a section of the multifunctional rotation transfer system.

According to second aspect, an arm module for a modular robot arm of an industrial robot comprises a housing having a first connection side and a second connection side, the first connection side being embodied to be controllably rotatable about an axis of rotation relative to the second connection side, the first connection side having a rotatable first connection device and the second connection side having a second connection device fixed to the housing. The arm module further comprises a multifunctional rotation transfer system for a rotation transfer of data signals, of electrical energy and of fluid. The arm module further comprises a drive device with a shaft assembly having an output shaft, the shaft assembly being connected in a rotationally fixed manner to the rotatable first connection device of the first connection side, the shaft assembly forming a section of the multifunctional rotation transfer system.

The multifunctional rotation transfer system comprises an electrical rotation transfer device and a fluidic rotation transfer device, said electrical rotation transfer device having an electrical slip ring device including a brush device having brushes and a slip contact ring device having slip contacts, said slip contact ring device being disposed on said output shaft of said shaft assembly at a longitudinal end section of the output shaft opposite to the rotatable first connection device such that said slip contacts of said electrical slip contact ring device co-rotate with said output shaft and tap electricity from the associated brushes of said brush device.

The fluidic rotation transfer device comprises a fluidic rotation passage having a fluid supply device having circumferential fluid channels as a stator and fluid lines arranged within the output shaft as a rotor, wherein the fluid supply device comprises an annular housing having a fluid transfer flange and a fluid transfer section adjacent thereto in axial direction, wherein the fluid lines each have a fluid line via hole associated with the respective circumferential fluid channel, and thus a fluid may be transferred between a circumferential fluid channel and a fluid line. The fluid supply device of the rotary fluidic feedthrough serving as a stator is arranged in the annular housing within the electrical slip contact ring device of electrical slip ring device serving as a rotor, and the fluidic feedthrough serves as a rotational bearing for the slip ring device, and vice versa.

According to third aspect, an industrial robot comprises a multifunctional rotation transfer system for a rotation transfer of data signals, of electrical energy and of fluid. The multifunctional rotation transfer system comprises an electrical rotation transfer device and a fluidic rotation transfer device, said electrical rotation transfer device having an electrical slip ring device including a brush device having brushes and a slip contact ring device having slip contacts, said slip contact ring device being disposed on said output shaft of said shaft assembly such that said slip contacts of said electrical slip contact ring device co-rotate with said output shaft and tap electricity from the associated brushes of said brush device.

The fluidic rotation transfer device comprises a fluidic rotation passage having a fluid supply device having circumferential fluid channels, and the longitudinal passage recess of the fluid path within the output shaft is formed as fluid lines, wherein the fluid lines each have a fluid line via hole associated with the respective circumferential fluid channel, and thus a fluid may be transferred between a circumferential fluid channel and a fluid line. The fluid supply device of the rotary fluidic feedthrough is arranged at least partially within the electrical slip ring device.

EXAMPLES

The arm module has a housing with a first connection side and a second connection side. The first connection side is embodied to be controllably rotatable about an axis of rotation relative to the second connection side. The first connection side has a rotatable first connection device and the second connection side has a second connection device fixed to the housing. Furthermore, a multifunctional rotation transfer system for rotary transmission of data signals, electrical energy and fluid is provided.

With such an arm module, a modular robot arm for an industrial robot may be provided which may be rotated as often as required, so that rotational angles significantly larger than 360° may be realized, as well.

In the arm module, a drive device is provided with a shaft assembly which is connected to the rotatable first connection device of the first connection side in a torque-proof manner, the shaft assembly forming a section of the multifunctional rotation transfer system.

This embodiment ensures a compact structure of the arm module, in which the rotatable part of the multifunctional rotation transfer system is combined in one section of the shaft assembly.

The shaft assembly may have an output shaft on which the rotatable first connection device of the first connection side is arranged, wherein a signal path is arranged as a central longitudinal passage recess, an electrical path is arranged as an eccentric longitudinal passage recess, and a fluid path is arranged as another eccentric longitudinal passage recess in the one output shaft.

The multifunctional rotation transfer system has an electrical slip ring device with a brush device comprising brushes and a slip contact ring device having slip contacts. The slip contact ring device on the output shaft of the shaft assembly is arranged in such a way that the slip contacts of the electrical slip contact ring device rotate with the output shaft and pick up electricity from the associated brushes of the brush device.

This embodiment of the multifunctional rotation transfer system allows for reliable transmission of electrical energy within the arm module between two connection sides that may be rotated relative to one another.

The multifunctional rotation transfer system further comprises a fluid supply device having circumferential fluid channels. The longitudinal passage recess of the fluid path within the output shaft is formed as fluid lines, wherein the fluid lines each have a fluid line passage hole associated with the respective circumferential fluid channel. Thus, a fluid is transferable between a circumferential fluid channel and a fluid line.

With a multifunctional rotation transfer system embodied in this way, fluid transmission may also particularly take place on several channels within the arm module between two connection sides that may be rotated relative to each other.

The fluid supply device of the multifunctional rotation transfer system is at least in sections arranged within the electrical slip ring device.

This radial arrangement of fluidic rotary feedthrough and electrical slip ring device is comparatively short compared to an axial arrangement, resulting in a small overall size.

In the following, the invention is explained in more detail by embodiments and examples with reference to the accompanying schematic drawings, which are not to scale. Sections, elements, parts, units, components and/or schemes which have an identical or analogous embodiment and/or function are indicated by the same reference numerals in the figure description, the list of reference numerals, the patent claims and in the figures of the drawing.

In the invention, a feature may be embodied positive, i.e., present, or negative, i.e., absent, with a negative feature not being explicitly explained as a feature unless value is placed on it being absent in accordance with the invention, i.e., the invention that is actually made and not constructed from the prior art consists in omitting this feature.

The features of the description may also be interpreted as optional features; i.e. each feature may be understood as an optional, arbitrary or preferred, i.e. a non-binding, feature. Thus, it is possible to extract a feature, possibly including its periphery, from an embodiment example, in which case this feature may be applied to a generalized idea of the invention. The absence of a feature in an embodiment example shows that the feature is optional with respect to the invention.

DETAILED DESCRIPTION

Figure 1:
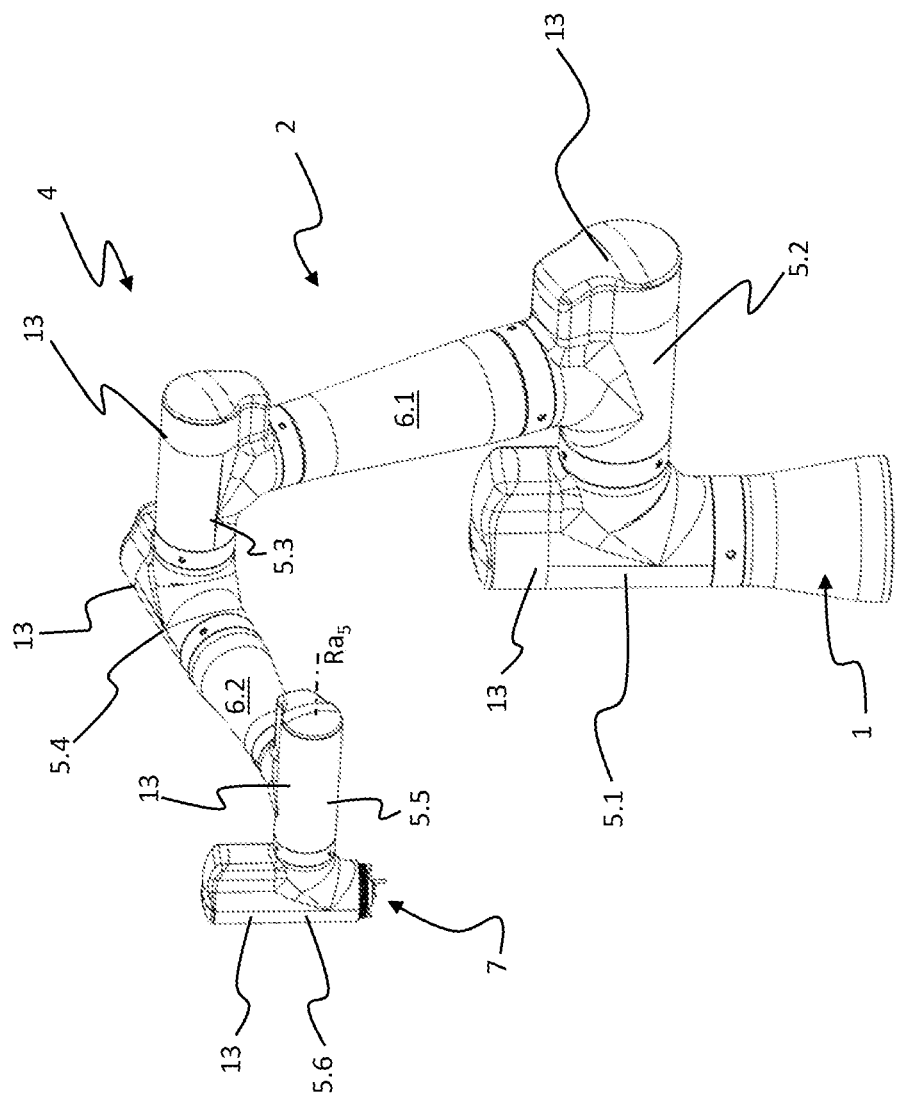
FIG. 1 shows a perspective view of an industrial robot with a modular, six-axis robot arm.

The present invention is described in more detail below with reference to embodiments of variants of an optical rotation transfer device for embodiments of a modular robotic arm for an industrial robot. Although the invention is described and illustrated in more detail by the embodiments, the invention is not limited by the disclosed embodiments, but is of a more fundamental nature.

In the drawing, only those spatial sections of an object of the invention are shown which are necessary for an understanding of the invention. Further, the explanation of the invention hereinafter refers to a polar coordinate system having an axial direction Ar, a radial direction Rr and a circumferential direction Ur. An axis of rotation Ra of a particular arm module is thereby coaxial or parallel to an axial direction Ar relating to that arm module.

Data signals, electrical current or voltage and fluid are to be transmitted in rotation by the multifunctional rotation transfer system in the modular industrial robot. The arm modules of the modular industrial robot are thereby to be connectable to one another via pluggable or screwable contacts. Corresponding connection devices for transmitting data signals, electrical current or electrical voltage and fluid should also be pluggable.

The corresponding equipment should be robust and able to maintain its functionality in an industrial environment. Furthermore, the corresponding equipment should be cost-effective and space-saving, as the individual arm modules should be compact and competitively priced.

The transmission of data signals may be carried out via optical signals that are guided through a fiber optic cable. Electrical signals guided in a data cable may also be used to transmit data signals. For this purpose, a signal rotation transfer device of the multifunctional rotation transfer system is required to be able to realize the specification of arm modules that are rotatable with regard to one another.

In order to be able to realize rotatability of the arm modules relative to one another, a rotation transfer of electric current or electric voltage takes place within the arm module via an electric rotation transfer device of the multifunctional rotation transfer system in the form of an electric slip ring device.

Furthermore, in order to be able to realize a rotational transmission of fluid, a rotational transmission of fluid takes place inside the arm module via a fluidic rotational gear device of the multifunctional rotation transfer system in the form of a fluidic rotational feedthrough.

FIG. 1 shows an exemplary embodiment of a variant of a robot arm 2 of a modular industrial robot, which may also be referred to as a handling robot or working machine. An industrial robot is an automatic machine with several degrees of freedom, which may perform various functions in a working environment in (conditional) autonomous performance with a pre-programmed controller/regulator. The modular industrial robot comprises a robot base 1, a robot arm 2 and a preferably exchangeable (end) effector, also referred to as a robot hand, e.g. comprising a tool, a gripper etc., which may be arranged at a distal end 7 of the robot arm 2.

The robot arm 2 has two to six axes of motion. In the embodiment shown in FIG. 1, six rotational degrees of freedom are provided. Any number of complete and partial rotations of a respective arm module of the robot arm 2 in both circumferential directions of a respective rotational axis may be carried out. It is possible to embody a respective rotational axis as a pivotal axis or rotational axis, as well, i.e. to limit a movement of the respective arm module to a certain angle, such as angles smaller than 720°, 540°, 360°, 270°, 180°, 90° or 45°.

Sensors may be assigned to an arm module 4 or to a respective rotation axis $Ra_n$ of the arm module 4, the data of which may be used for controlling the corresponding arm module 4 or the robot arm 2. For example, a force and/or torque sensor as well as a position sensor may be provided, by which a force and/or torque on the arm module 4 as well as a position of the arm module 4 may be detected. This may also be limited to a section or to a longitudinal end section of the robot arm 2.

The present robot arm 2 of the industrial robot has a modular embodiment with a plurality of arm modules 4. In principle, the arm modules 4 may be embodied as desired, wherein, as shown in FIG. 1, a distinction may be made between active arm modules 5 and passive arm modules 6. An active arm module 5 has a drive device 13, by which a further arm module 4 connectable thereto may be swiveled, pivoted and/or rotated. Similarly, a passive arm module 6 has no drive device. All features of the arm module 4 which are described essentially for an active arm module 5 may also be embodied analogously or in adapted form in a passive arm module 6. Alternatively, a passive arm module 5 may also have none or only some of the described rotation transfer devices for data, energy and/or fluid.

A certain modular system for a robot arm 2 has at least one type of active arm module 5 in J-shape and, as the case may be, at least one type of passive arm module 6 in I-shape, in each case with connections on the front face and/or longitudinal/trunk side and in each case mechanically complementary or mechanically analogous to one another. Instead of a J-shape for the active arm module 5 or an I-shape for the passive arm module 6, other geometric shapes may be used.

Apart from the robot base 1 and/or an effector at the distal end 7, all arm modules 4 of such a modular system for robot arms 2 are preferably embodied in such a way that two connections of two arm modules 4 always correspond to one another and may be connected to one another. This means that a first connection side of any arm module 4 of the modular system may be connected to a second connection side of any other arm module 4 of this modular system, or vice versa. Preferably, the first connection side and the second connection side of the arm module 4 each have a uniform, complementary contacting mimic which ensures compatibility of the arm modules 4 across relevant, in particular all, series of the modular system.

In FIG. 1, the active arm modules 5 and the passive arm modules 6 are each provided with an additional number separated by a dot for differentiation purposes, with numbering starting from the robot base 1 in the direction of the distal end 7. In case of the robot arm 2 in the embodiment according to FIG. 1, a first active arm module 5.1 is connected to the robot base 1 at the first connection side. The first connection side of a second active arm module 5.2 is connected to the second connection side of the first active arm module 5.1. A first passive arm module 6.1 is arranged between the second active arm module 5.2 and a third active arm module 5.3, the first passive arm module 6.1 connecting the second connection side of the second active arm module 5.2 to the second connection side of the third active arm module 5.3. The second connection side of a fourth active arm module 5.4 is connected to the first connection side of the third active arm module 5.3. The first connection side of the fourth active arm module 5.4 is connected to the second connection side of a fifth active arm module 5.5 via a second passive arm module 6.2. The second connection side of a sixth active arm module 5.6 is connected to the first connection side of the fifth active arm module 5.5, the first connection side of the sixth active arm module 5.6 then forming the distal end 7 of the robot arm 2.

Figure 2:
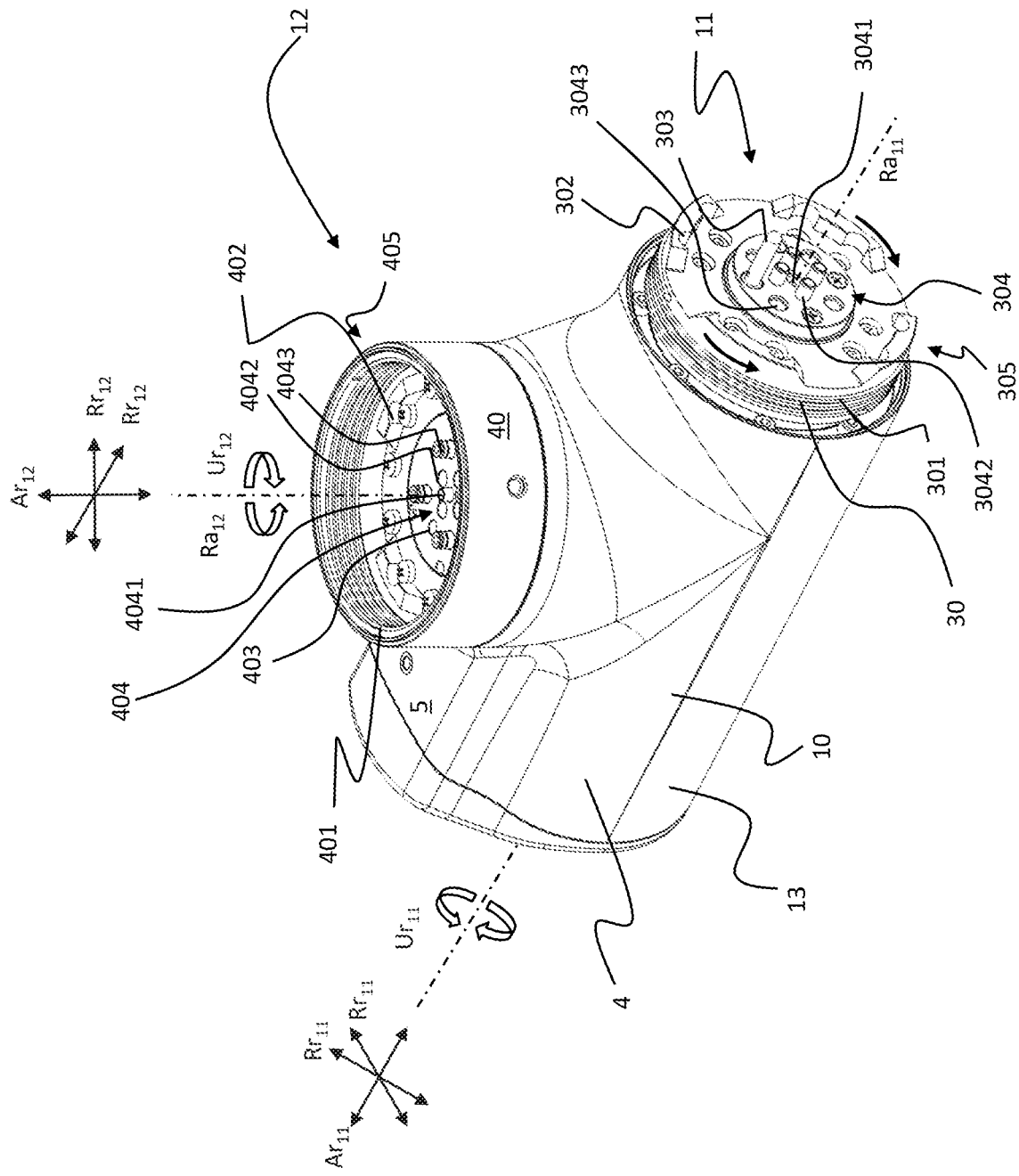
FIG. 2 shows a perspective view of an active arm module for a robot arm of FIG. 1.

FIG. 2 shows a perspective view of an example of an active arm module 5 for the robot arm 2 of FIG. 1. Here, a J-shaped housing 10 mechanically connects the first connection side 11 to the second connection side 12. For the first connection side 11 and the second connection side 12, a respective polar coordinate system with an axial direction Ar, a radial direction Rr and a circumferential direction Ur is shown, each of which is provided with a corresponding index for the associated connection side. Furthermore, an associated rotational axis Ra with the corresponding index is shown for each connection side.

The first connection side 11 of the active arm module 5 may be mechanically, optically, electrically and fluidically coupled to the second connection side of a further arm module 4. Furthermore, the second connection side 12 of the active arm module 5 may be mechanically, signal-based, e.g. optically, electrically and fluidically coupled to the first connection side of a further arm module 4. Here, the first connection side 11 of the active arm module 5 is preferably provided rotatably on the active arm module 5, with the second connection side 12 then being set up on the active arm module 5 in a fixed manner. However, the rotatable and non-rotatable connection side may also be defined in an exactly opposite manner. In a passive arm module 6 in FIG. 1, both the first connection side and the second connection side are rigidly embodied on an I-shaped housing. The first connection side and the second connection side of the active and passive arm modules are embodied to correspond to each other.

In the arm module 5 shown in FIG. 2, the first connection side 11 has a first rotatable connection device 30 and the second connection side 12 has a second connection device 40 fixed to the housing.

The rotatable first connection device 30 which extends perpendicularly to the axis of rotation $Ra_{11}$ of the first connection side 11 is circular in shape and is rotatably arranged on the housing 10. An external thread 301 is provided on an outer circumferential side of the first connection device 30. The first connection device 30 has a first spur toothing 302 with four teeth, said first spur toothing 302 being embodied as Hirth toothing. The external thread 301 and the first spur toothing 302 form first mechanical connection elements 305 of the rotatable first connection device 30.

The first connection device 30 also includes a first contact device 304 that includes a first signal interface device 3041, a first electrical interface device 3042, and a first fluid interface device 3043.

The second connection device 40, which is fixed to the housing and is also circular in shape, is aligned perpendicular to the axis of rotation $Ra_{12}$ of the first connection side 12 and is connected to the housing 10 in a torque-proof manner. On the circumferential side, the second connection device 40 has a fastening ring 401 with an internal thread, the internal thread being formed to correspond to the external thread 301 of the first connection device 30. The second connection device 40 further comprises a second spur toothing 402 having four teeth, which is formed as Hirth toothing and is formed complementary to the teeth of the first spur toothing 302 of the first connection device 30. A centering receptacle 403 is additionally provided in the second connection device 40, corresponding to the centering pin 303 of the first connection device 30. The fastening ring 401 with the internal thread and the second spur toothing 402 form second mechanical connection elements 405 of the second connection device 40 fixed to the housing.

The second connection device 40 further comprises a second contact device 404 including a second signal interface device 4041, a second electrical interface device 4042, and a second fluidic interface device 4043, that are complementary to the first signal interface device 3041, the first electrical interface device 3042, and the first fluidic interface device 3043 of the first contact device 304 of the first connection device 30.

When assembling the robot arm 2 as shown in FIG. 1, the first connection device 30 of an active arm module 5 is placed on the second connection device 40 of a first further active arm module 5. In this process, the centering pin 303 engages the centering receptacle 403. The centering pin 303 and the centering receptacle 403 thus serve as an encoding device. However, a coding of a different type could also be provided. For example, coding could be provided via a complementary geometry of the connection devices.

By twisting the fastening ring 401, the internal thread is screwed onto the external thread 301, pressing the second connection device 40 onto the first connection device 30. In the pressed-on state, the first spur toothing 302 and the second spur toothing 402 engage with each other in such a way that the first connection device 30 and the second connection device 40 are mechanically connected to each other in a torque-locking manner. Furthermore, the first contact device 303 contacts the second contact device 403 so that a signal, electrical and fluid coupling is provided for the transfer of data signals, electrical current or electrical voltage and fluid.

The first contact device 304 of the first connection device 30 with the respective interface device and the second contact device 404 of the second connection 40 with the respective interface device are arranged radially within the mechanical connection formed by the external thread 301 and the first spur toothing 302 of the first connection device 30 and the fastening ring 401 with the internal thread of the second spur toothing 402 of the second connection device 40.

The signal coupling of the active arm modules 5 is carried out by transmission between the first signal interface device 3041 of the first contact device 303 and the second signal interface device 4041 of the second contact device 403, which may be plugged into each other. Preferably, the signal interface devices are embodied as simple opto- or electromechanical contact connection devices or plug-in connection devices.

The electrical coupling of the active arm modules 5 is carried out by transmission between the first electrical interface device 3042 of the first contact device 303 and the second electrical interface device 4042 of the second contact device 403. Preferably, the electrical interface devices are embodied as simply structured electromechanical contact connection devices or plug connection devices.

The fluidic coupling of the active arm modules 5 is performed by transmission between the first fluidic interface device 3043 of the first contact device 303 and the second fluidic interface device 4043 of the second contact device 403. Preferably, the fluidic interface devices are in this context embodied as simply designed fluid-mechanical contact connection devices or plug-in connection devices.

The signal coupling is provided on the central axis, in particular the axis of rotation, of the mechanical connection. The electrical coupling and the fluidic coupling are provided radially outside of the signal coupling.

Assembly was exemplarily explained for two active arm modules 5 of the robot arm 2 in FIG. 1. Passive arm modules 6 are mounted in the same way. By connecting the first connection device 30 to the second connection device 40, adjacent arm modules 4 are mechanically attached. Furthermore, a signal-based, electrical and fluid coupling is provided for the transmission of data signals, electrical current or electrical voltage and fluid.

Figure 3:
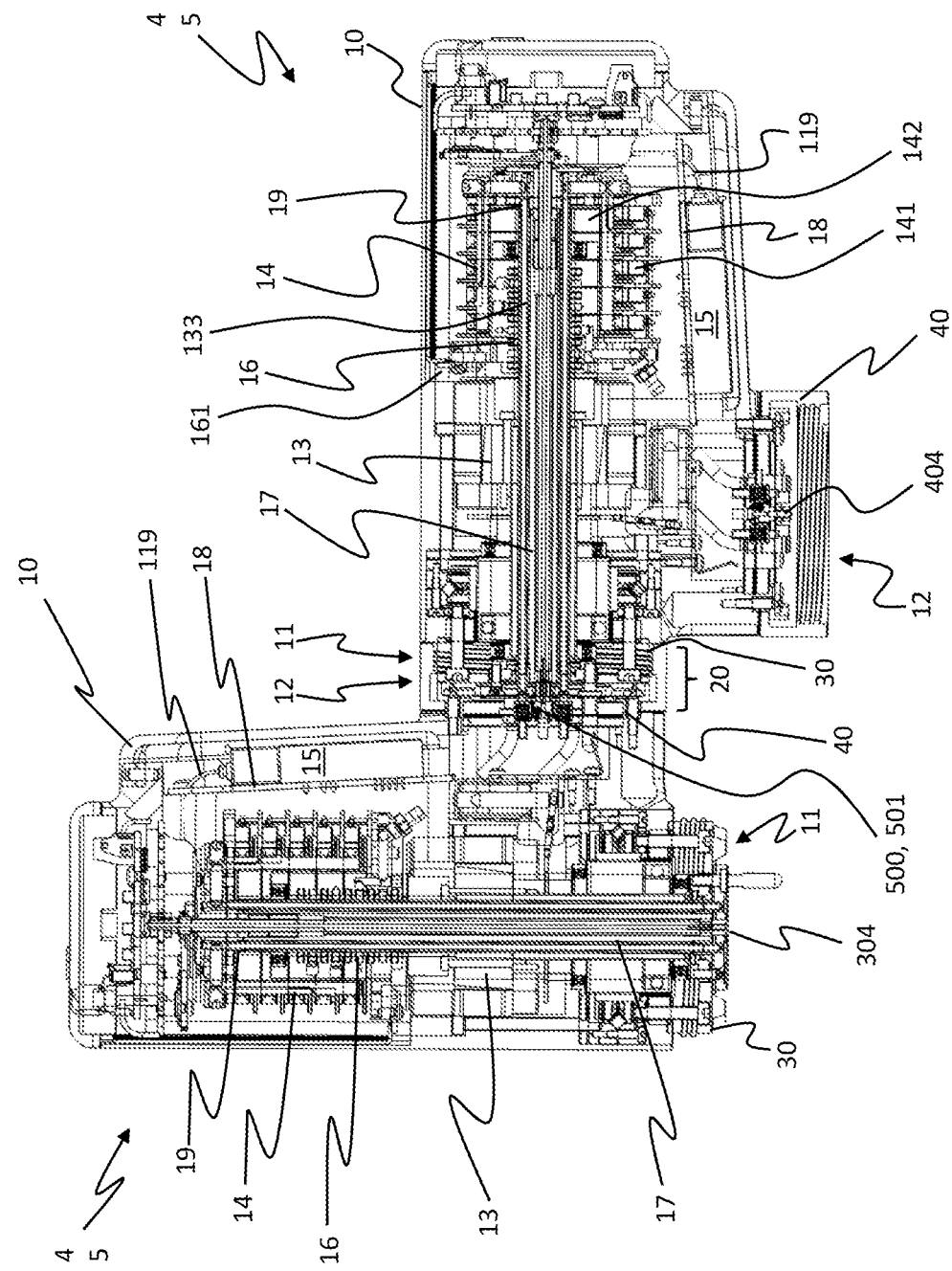
FIG. 3 depicts a sectional view of two interconnected active arm modules of the industrial robot from FIG. 1.
Figure 4:
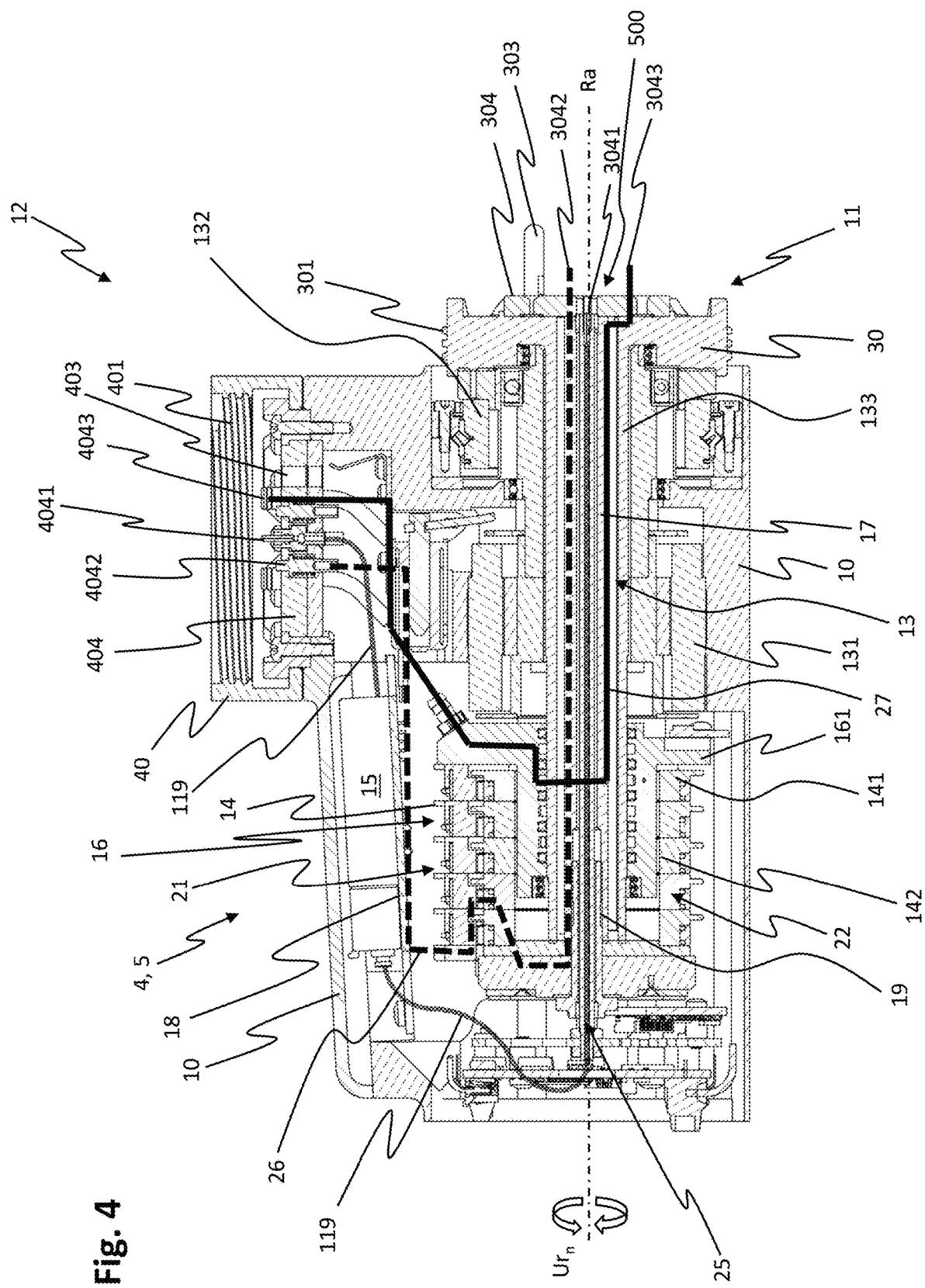
FIG. 4 shows a sectional view of an active arm module of FIG. 3 with a multifunctional rotation transfer system, wherein paths of a signal transmission, electrical energy transmission and fluid transmission are shown schematically.

FIG. 3 shows a sectional view of two interconnected active arm modules 5 of the industrial robot according to FIG. 1 in a first embodiment. The two active arm modules 5 are provided with the first connection side 11 and the second connection side 12 shown in FIG. 2. The two active arm modules 5 have an identical structure, which is why the same reference numerals are used for the components of the two active arm modules 5. FIG. 4 further shows a single active arm module 5 of FIG. 3, again in a centrally sectional, two-dimensional side view, wherein the active arm module 5 in the embodiment shown in FIG. 4 has a housing 10 without an end cap at the side opposite to the first connection side 11 in the direction of the axis of rotation Ra11 of the first connection side 11.

The facing first and second connection sides 11, 12 of the two active arm modules 5 form a mechanical interface 20, wherein the rotatable first connection device 30 of the first connection side 11 and the second connection device 40, fixed to the housing, of the second connection side 12 lie on top of each other and have been mounted in the manner explained above. Thereby, the first contact device 303 of the first connection device 30 contacts the second contact device 403 of the second connection device 40, so that a transmission of data signals, electrical current or electrical voltage and fluid may take place between the two contact devices via their signal, electrical and fluid interface devices.

The drive device 13 is set up in the housing 10 of the active arm module 5, the drive device 13 preferably having an electric motor 131 and a gear device 132. Between the electric motor 131 and the gear device 132, a shaft assembly 19 of the drive device 13 with a hollow shaft 133 is preferably provided, which may particularly rotate comparatively quickly and in which an output shaft 17 is arranged which may particularly rotate comparatively slowly.

The electric motor 131 drives the fast hollow shaft 133 as input shaft of the gear device 132 with an output speed. An output of the gear device 132 is preferably connected to the slow output shaft 17 in a rotationally fixed manner. The output shaft 17, in turn, is connected to the first connection device 30 of the first connection side 11 in a torque-proof manner and, starting from the latter, extends into the hollow shaft and preferably also through it, preferably being mounted by mean of a rotational bearing.

Furthermore, the active arm module 5 has an electronic module control unit 18 for controlling the drive device 13. The module control unit 18 receives its control data from a transceiver 15 preferably provided on a circuit board of the module control unit 18, wherein said transceiver 15 may also be referred to as a transceiver unit and is preferably embodied as a bidirectional SFP module. On the one hand, an integrated circuit of the transceiver 15 electrically processes and transmits received signals from a transceiver photodiode and, on the other hand, converts received electronic signals into suitable optical pulses for a transceiver laser. Such SFP modules are standard in network technology.

The transceivers 15 of the module control units 18 of the two adjacent active arm modules 5 communicate with each other optically via optical waveguides 119. The optical waveguides 119 also connect the first and second connection sides 11, 12 within the housing 10 to the respective transceiver 15 of the active arm module 5. The signal transmission path in the housing 10 of the active arm module 5 is embodied as an optical transmission path in the embodiment in FIG. 3 as an optical transmission path and runs from the first connection side 11 via the optical waveguide 119 which is first arranged in the output shaft 17 (see FIG. 4) and then led out of the output shaft 17 to the transceiver 15 and from the transceiver 15 further on via the optical waveguide 119 to the second connection side 12.

The optical data transmission may be bidirectional. Instead of using an optical transmission path, the signals may also be transmitted on another transmission medium such as an electrical conductor. With the output shaft 17, the first connection side 11 and the second connection side 12 are indirectly connected to each other mechanically, based on signals, electrically and fluidically within the active arm module 5, wherein a multifunctional rotation transfer system is formed in the active arm module 5. The output shaft 17 functions as a participant or section of a mechanical, optical, electrical and fluidic rotation transfer in the multifunctional rotation transfer system.

The mechanical transfer of rotation within the active arm module 5 is provided by the drive device 13 which rotates the first connection device 30 of the first connection side 11 of the active arm module 5, which is fixed to the output shaft 17 in a torque-proof manner, against the housing 10 and thus against the second connection device 40 of the second connection side 12, which is fixed to the housing.

For the electrical rotation transfer within the active arm module 5, as shown in FIG. 4, the active arm module 5 has an electrical rotation transfer device 21, which in turn has an electrical slip ring device 14 between the housing 10 and the output shaft 17, which provides for rotation transfer of electrical energy between the rotatable first connection device 30 of the first connection side 11 and the housing-fixed second connection device 40 of the second connection side 12. As a stator, the slip ring device 14 comprises an electrical brush device 141 connected to the housing 10 in a fixed manner, and as a rotor an electrical slip contact ring device 142 arranged on the output shaft 17. The electrical rotation transfer device 21 is embodied in such a way that viewed in the axial direction, the electric slip contact ring device 142 of the slip ring device 14 is arranged at a longitudinal end portion of the output shaft 17 opposite to the rotatable first connection device 30.

Furthermore, as further shown in FIG. 4, the active arm module 5 comprises a fluidic rotation transfer device 22 with a fluidic rotary feedthrough 16 for a rotation transfer of fluid within the active arm module 5, which ensures a fluid-tight transition between the rotatable first connection device 30 of the first connection side 11 and the housing-fixed second connection device 40 of the second connection side 12. The fluidic rotary feedthrough 16 has a multi-channel design and comprises, as a stator, a fluid supply device 161 that is fixedly connected to the housing 10 and, as a rotor, fluid lines 171 that are arranged in the output shaft 17.

Here, the rotary feedthrough 16 may be at least partially set up in the slip ring device 14 or further rotationally support the slip ring device 14 or vice versa. Such a radial arrangement is space-saving and allows a small overall size.

Starting from the rotatable first connection device 30, the output shaft 17 extends into the hollow shaft 133 through the gear device 132, the electric motor 131, the fluidic rotary feedthrough 16 and the electrical slip ring device 14. A first bearing arrangement of the output shaft 17 is provided in a region of the rotatable first connection device 30 by a bearing on the hollow shaft 133. The hollow shaft 133 is in turn supported by the electric motor 131, the housing 10, e.g. via a roller bearing, and the gear device 132. A second bearing of the output shaft 17 is provided by a feedthrough housing of the fluidic rotary feedthrough 16, e.g. via a roller bearing. Furthermore, the output shaft 17 may alternatively or additionally be supported by the electrical slip contact ring device 142 of the electrical slip ring device 14.

In the area of the mechanical interface 20, an optical rotation transfer device 500 is set up between the rotatable first connection device 30 of the first connection side 11 of the one active arm module 5 and the second connection device 40, fixed to the housing, of the second connection side 12 of the other active arm module 5, which in the embodiment example of FIG. 3 is embodied as a first optical rotation transfer device 501. The first optical rotation transfer device 501 has, on the first connection device 30 rotatable with respect to the one active arm module 5, the first signal interface device 3041 serving as a rotor. Opposite in the axial direction Ar, the first optical rotation transfer device 501 has, as a stator, the second optical interface device 4041 which is provided in the second connection device 40 which is fixed to the housing with respect to the further active arm module 5.

FIG. 4 further schematically shows the paths of the rotation transfer, i.e., an optical signal path 25 for optical signal transmission, an electrical path 26 for electrical current and voltage transmission, and a fluid path 27 for fluid transmission in a single active arm module 5 of FIG. 3, wherein the first connection side 11 and the second connection side 12 of the active arm module 5 correspond to the embodiment shown in FIG. 2.

Figure 5:
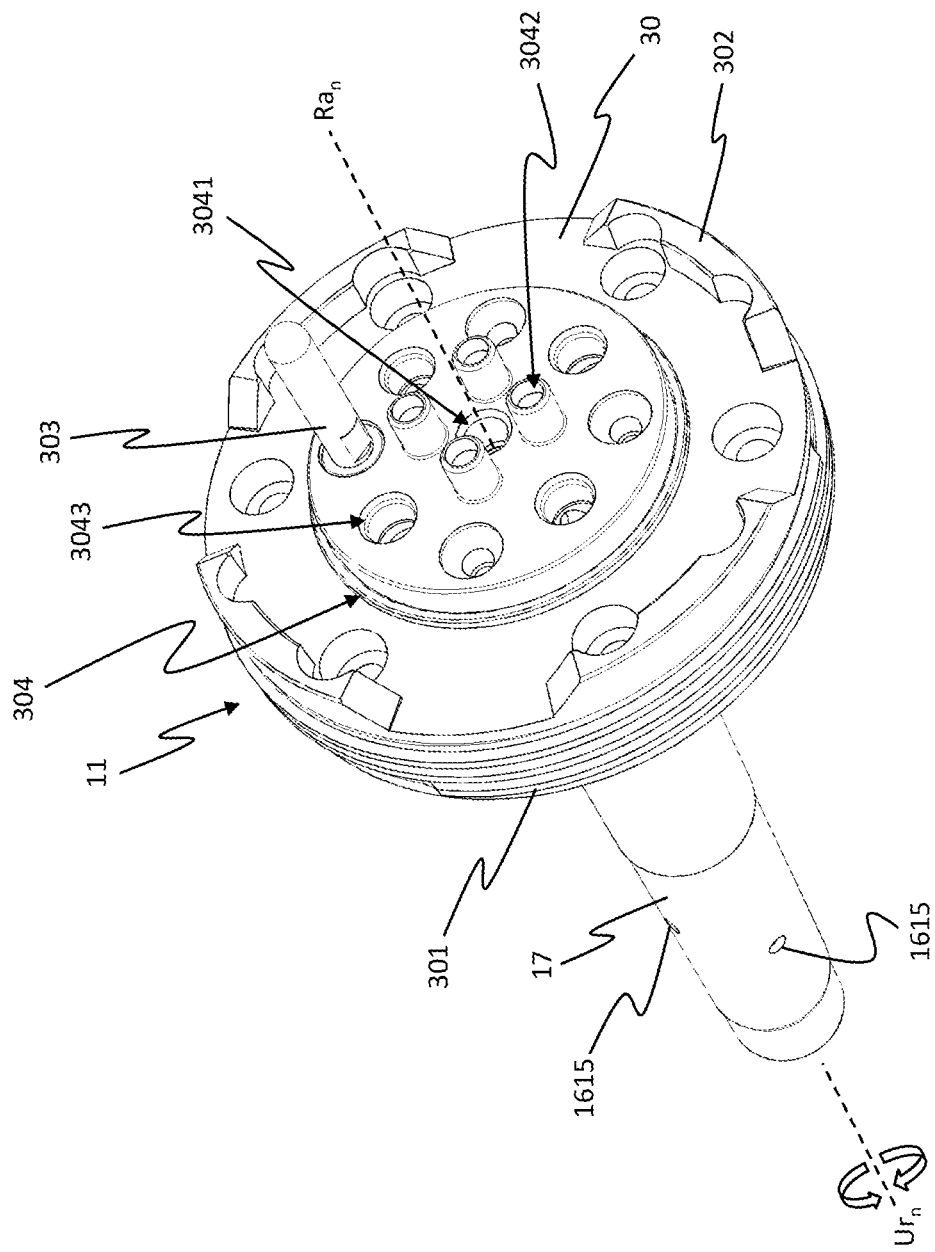
FIG. 5 is a perspective view of the rotatable output shaft with a rotatable connection device connected to it in the active arm module of FIG. 4.
Figure 6:
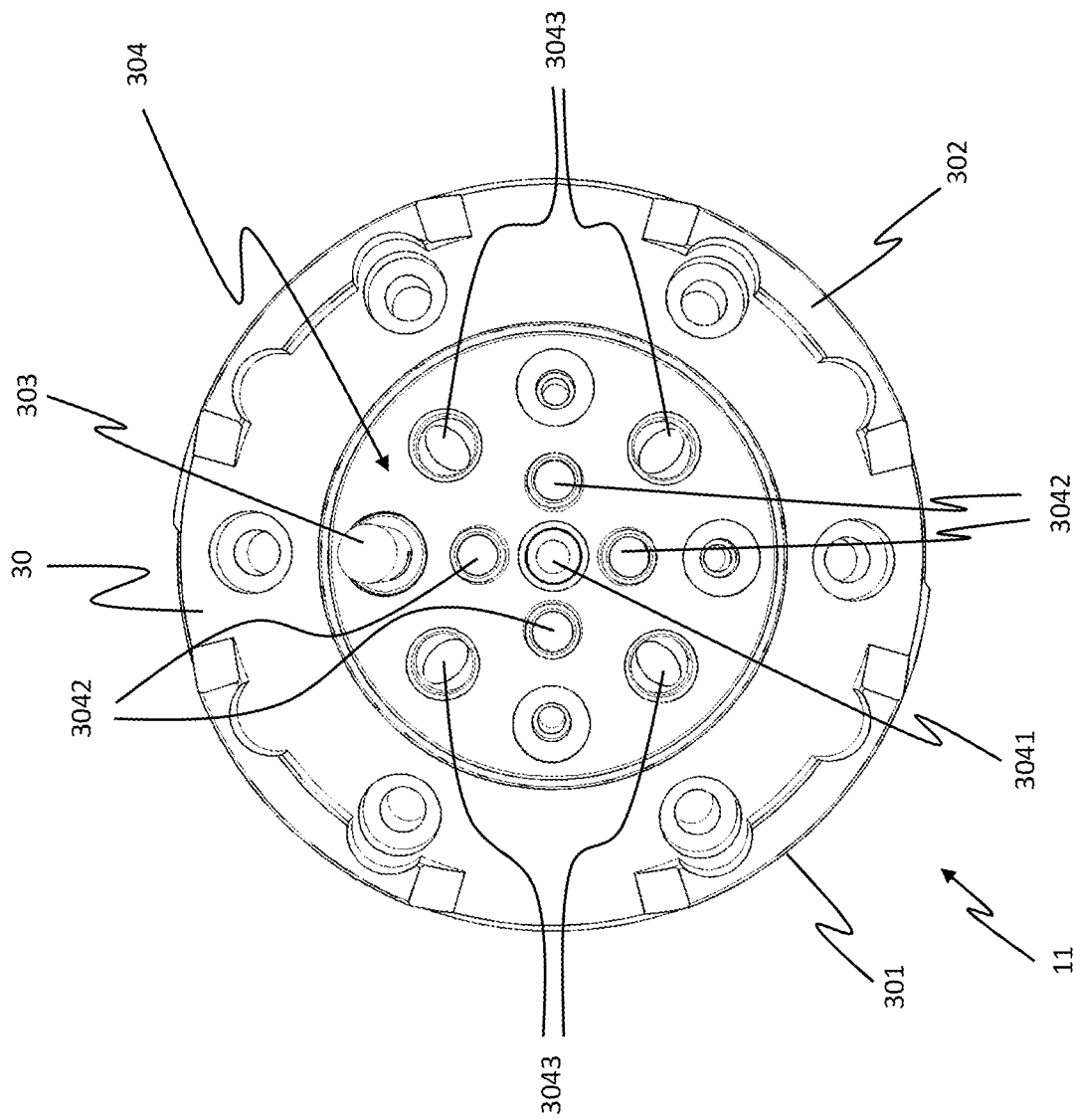
FIG. 6 is a top view of the rotatable connection device of FIG. 5.
Figure 7:
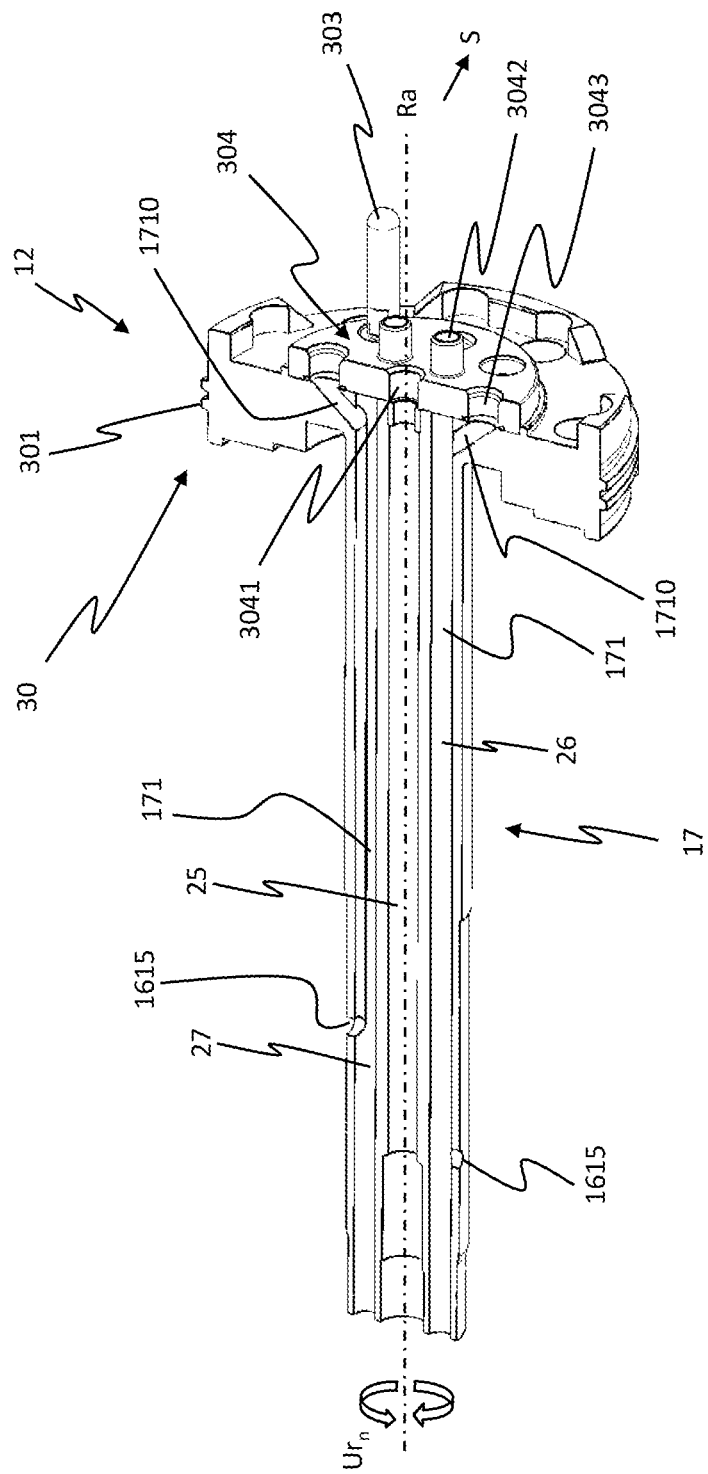
FIG. 7 shows a sectional view of the rotatable output shaft with the rotatable connection device connected thereto from FIG. 5.

For clarification, FIG. 5 shows a perspective view of the rotatable output shaft 17 with a rotatable first connection device 30 connected to it in the active arm module 5 of FIG. 4. FIG. 6 further shows a top view of the rotatable first connection device 30. FIG. 7 shows a centrally sectional, two-dimensional side view of the rotatable output shaft 17 with the rotatable connection device of FIG. 5 connected to it.

The active arm module 5 has the optical signal path 25, shown by a dotted line in FIG. 4, the electrical path 26, shown by a dashed line in FIG. 4, and the fluid path 27, shown by a solid line in FIG. 4, with the various paths extending between the rotatable first connection device 30 of the first connection side 11 and the housing-fixed second connection device 40 of the second connection side 12 in the active arm module 5.

The respective path is intended to represent a respective totality of all possible optical, electrical and fluidic paths within the active arm module 5. Thus, in the embodiment shown in FIG. 4, a single optical path is provided in the optical signal path 25, four electrical paths in the electrical path 26, and four fluidic lines in the fluidic path 27.

In the following, the path courses are described. A respective "start" and a respective "end" of a respective path may be interchanged.

The optical signal path 25 starts externally at the second signal interface device 4041 of the housing-fixed second connection device 40, which serves as a rotor of a first signal rotation transfer device 501 with respect to a further arm module 4 connected to the second connection side 12. The optical waveguide 119 is optomechanically connected to the second signal interface device 4041. The optical waveguide 119 leads to the transceiver 15 on the circuit board of the electronic module control unit 18. From the transceiver 15, the optical waveguide 119 further runs through the output shaft 17 of the drive device 13 to the rotatable first connection device 30.

In the rotatable first connection device 30, the optical waveguide 119 is optomechanically connected to the first signal interface device 3041, which serves as a stator of the first signal rotation transfer device 501 with respect to a further arm module 4 connected to the first connection side 11. The optical waveguide 119 is thereby guided in a non-rotatable manner in an axially continuous bore, which may also be referred to as a longitudinal passage recess, of the output shaft 17. On the outside of the first signal interface device 3041 of the rotatable first connection device 30, the optical signal path 25 ends. Instead of an optical waveguide connection, an electrical data line may also be used.

The electrical path 26 starts externally at the second electrical interface device 4042 of the second connection device 40 fixed to the housing. The electrical interface device 4042 has four electrical mating connection devices, to each of which an electrical conductor is electromechanically connected. The electrical conductors lead to the drive device 13 and to the module control unit 18 to supply electrical voltage and electrical current, respectively. Electrical conductors each continue from the drive device 13 and the module control unit 18 to the electrical brush device 141 of the electrical slip ring device 14, which serves as the stator.

The electrical brush device 141 of the electrical slip ring device 14 transmits electrical energy to the electrical slip contact ring device 142 of the electrical slip ring device 14, which serves as a rotor and is arranged at the output shaft 17. The slip contact ring device 142 of the slip ring device 14 is connected to four electrical conductors provided in the output shaft 17. The four electrical conductors in the output shaft 17 terminate in four electrical connection devices, which are parts of the first electrical interface device 3042 of the rotatable first connection device 30 and in which the electrical path 26 terminates externally on the active arm module 5. Two of the electrical conductors are used to supply the transceiver 15 to the drive device 13 and the module control unit 18, while the other two conductors may be used in a user-specific manner, e.g. to supply an (end) effector.

An additional electrical path of the active arm module 5 is embodied between the centering receptacle 403 at the second connection device 40, which may receive a centering pin 303 of a further arm module 4 arranged thereon. This further electrical path serves as potential equalization between the individual arm modules 4. From the centering receptacle, the drive device 13 and the module control unit 18 and the housing 10 are electrically connected via electrical conductors, as well. Electrical conductors then each continue from the drive device 13 and the module control unit 18 to the electrical brush device 141 of the electrical slip ring device 14, which serves as the stator.

The brush device 141 of the electrical slip ring device 14 is electrically connected to the electrical slip contact ring device 142 of the electrical slip ring device 14, which serves as a rotor and is arranged on the output shaft 17. The slip contact ring device 142 of the slip ring device 14 is electrically connected to the output shaft 17 for potential equalization. In turn, the output shaft 17 is electrically connected to the centering pin 303, which is arranged in the first connection side 30. The centering pin 303 in conjunction with the centering sleeve 403 thus not only serves to simplify the assembly of two arm modules 4 with respect to each other, but additionally provide a required electrical potential equalization. The two electrical paths described in combination thus form the electrical path 26 of the arm module 4.

The fluid path 27 starts on the outside at the second fluidic interface device 4043 of the housing-fixed second connection device 40. The second fluidic interface device 4043 has four fluidic mating connection devices, to each of which a fluid transport line is fluidically connected. The fluid transport lines lead to the fluid supply device 161 of the fluidic rotary feedthrough 16, which serves as a stator. The fluid supply device 161 of the fluidic rotary feedthrough 16 transfers the fluid transportable by the fluid transport lines to the four circumferential fluid channels 1616 formed in the fluid supply device 161.

The output shaft 17 serves as a rotor and has four fluid line via holes 1615, each associated with a circumferential fluid channel 1616. Thus, the fluid in the respective circumferential fluid channel 1616 may be transferred to a fluid line 171 through the respective associated fluid line via hole 1615 during rotation of the output shaft 17. Four fluid lines 171 are formed as longitudinal bores in the output shaft 17. The four fluid lines 171 open into four fluid connection lines 1710 formed in the first connection device 30, which open into four fluid plug connection devices that are parts of the first fluid interface 3043 of the rotatable first connection device 30 and in which the fluid path 27 ends on the outside of the active arm module 5.

Figure 8:
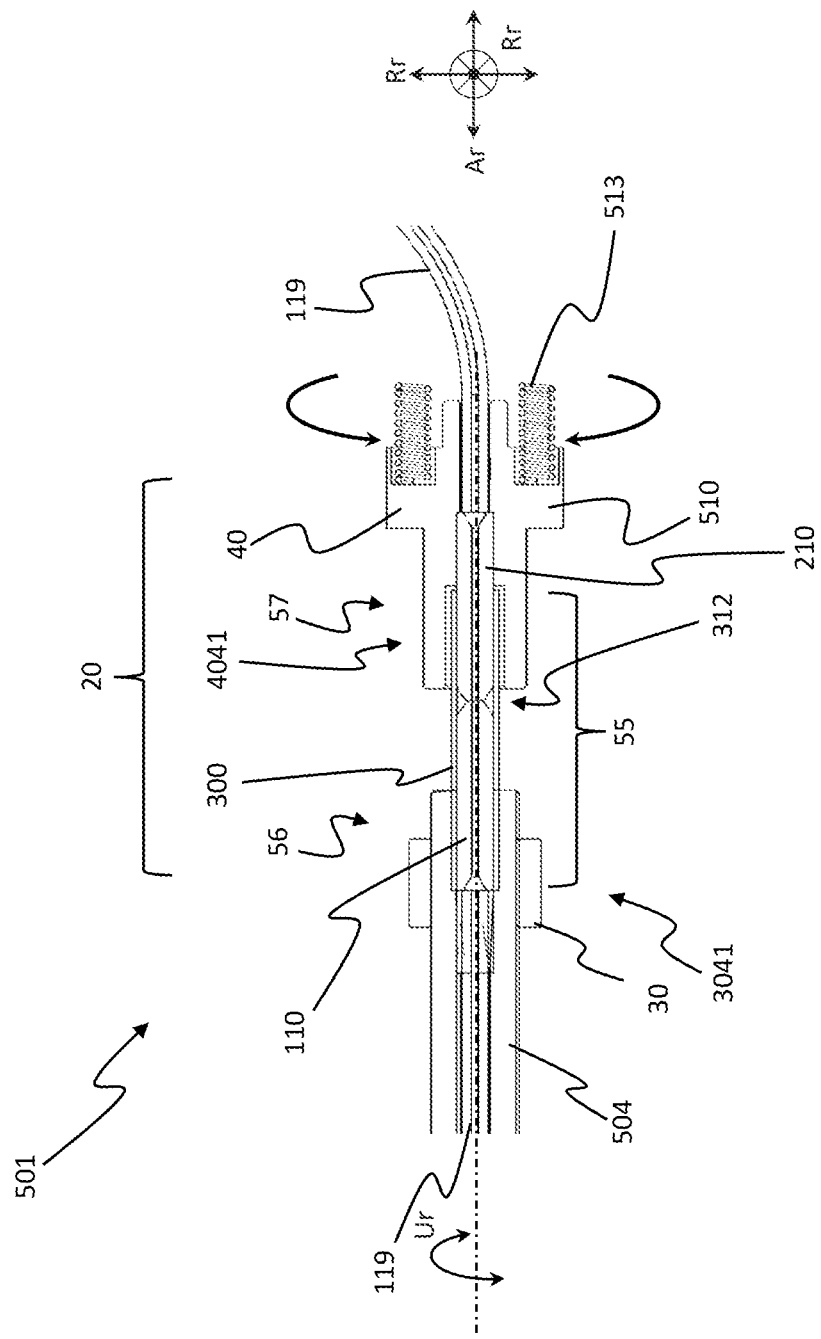
FIG. 8 depicts a detailed view of an embodiment of the signal rotation transfer device in the multifunctional rotation transfer system.

In the following, with reference to FIG. 8, a detailed view of an embodiment of the first signal rotation transfer device 501 of FIG. 3 is described in more detail, which is embodied as an optical rotation transfer device. FIG. 8 also shows the polar coordinate system from FIG. 2 with the axial direction Ar, the radial direction Rr, the circumferential direction Ur and the associated rotational axis Ra to indicate the orientation of the individual components.

The first signal rotation transfer device 501 is set up in the mechanical interface 20 between the two active arm modules 5 and constitutes an optomechanical rotation interface 55. On the one hand, the mechanical interface 20 comprises the rotatable first connection device 30 of the one active arm module 5. On the other hand, the mechanical interface 20 comprises the housing-fixed second connection device 40 of the further active arm module 5.

On the first connection device 30, which is rotatable with respect to the one active arm module 5, the first signal rotation transfer device 501 has a first interface side 56 with the first signal interface device 3041, which serves as a rotor. Opposite in the axial direction Ar, the first signal rotation transfer device 501 has, on the second connection device 40 which is rotatable with respect to the further active arm module 5, a second interface side 57 with the second signal interface device 4041 which serves as a stator. The further active arm module 5 is thereby rotatable by the active arm module 5.

The first signal interface device 3041 radially inwardly comprises a first ferrule 110 having the optical waveguide 119 of the one active arm module 5 mechanically and optically connected thereto. Radially outwardly on an outer circumferential edge of the first ferrule 110, a radial bearing sleeve 300 forming a radial plain bearing is arranged. Here, the radial bearing sleeve 300 is seated on the first ferrule 110 with a bonded first longitudinal end portion and protrudes from a free longitudinal end of the first ferrule 110 with a free second longitudinal end portion in an axial direction Ar.

The radial bearing sleeve 300 in conjunction with the first ferrule 110 is provided in a first receptacle 504 of the rotatable first connection device 30, particularly in a fixed manner. The first receptacle 504 may e.g. be formed as a tube, a sleeve, etc. Presently, the first receptacle 504 is particularly embodied as a brass tube. The first receptacle 504 may comprise e.g. a bore and/or a device for attaching of the optical waveguide 119, the first ferrule 110 and/or the radial bearing sleeve 300.

The first receptacle 504 is preferably arranged within the output shaft 17. The first receptacle 504 may be provided integrally with the output shaft 17 or may be partially made of one material piece or integrally formed with the output shaft 17. Via the first receptacle 504, the first interface side 56 is thus connected to the output shaft 17 of the shaft assembly 19 in a torque-proof manner.

Likewise, the second signal interface device 4041 radially inwardly comprises a second ferrule 210 with the optical waveguide 119, mechanically and optically connected thereto, of the further active arm module 5. The second ferrule 210 is set up in a second receptacle 510 of the second connection device 40, fixed to the housing, of the further active arm module 5, a section of the second ferrule 210 facing away from a free longitudinal end of the second ferrule 210 in the axial direction Ar (to the right with reference to FIG. 8) being provided, in particular in a fixed manner, in the second receptacle 510. A portion of the second ferrule 210 projecting in the other axial direction Ar (to the left with reference to FIG. 8) with the free longitudinal end of the second ferrule 210 is on the outside embodied as a plain bearing shell for the radially inner surface of the radial bearing sleeve 300.

A portion of the second ferrule 210 originating from the free longitudinal end of the second ferrule 210 is arranged within the second receptacle 510 and is fully radially distanced from the second receptacle 510. That is, the second receptacle 510 is correspondingly recessed. The recess between the section of the second ferrule 210 and the second receptacle 510 is preferably of hollow-cylindrical embodiment and serves to receive the second free longitudinal end section of the radial bearing sleeve 300 projecting away from the first ferrule 110 in the axial direction Ar. The section of the second ferrule 210 with the free longitudinal end externally serves as a plain bearing shell for the radially inner surface of the second free longitudinal end section of the radial bearing sleeve 300.

The second ferrule 210 is arranged in a fixed manner on or in the further active arm module 5 relative to the housing 10 via the second receptacle 510 of the second connection device 40 fixed to the housing. The second receptacle 510 may comprise a device, e.g. a bore, and/or a device for fixing the optical waveguide 119 and/or the second ferrule 210.

It is preferred that the second receptacle 510 is mechanically pre-tensioned against the first receptacle 504 by one or a plurality of springs 513. Instead of a spring 513, an elastic element may be used, as well. After plugging of the rotation interface 55 or the active arm modules 5, i.e. when the first optical rotation transfer device 501 is set up, a gap 312 is set up between the two longitudinal end portions of the first ferrule 110 and the second ferrule 210 provided in the radial bearing sleeve 300, so that the two free longitudinal ends of the ferrules are not in a mechanical rotational slip contact. The gap 312 is preferably arranged as a fluid gap, in particular as an air gap. The gap may be secured in various ways between the longitudinal end portions of the ferrules within the radial bearing sleeve 300.

The gap 312 may e.g. be secured via the positions of the ferrules in the rotatable first connection device 30 and in the housing-fixed second connection device 40, the positions of which must in turn be ensured relative to the housing concerned. Furthermore, for this purpose, e.g. an axially mutually mounted, e.g. mounted by a plain bearing, seating of the receptacles is possible. Furthermore, the gap 312 may be implemented by the mechanical interface 20, which is embodied and may be set up in such a way that the gap 312 is set up when the first optical rotation transfer device 501 is embodied in a certain way.

The optical signal transmission takes place in the optomechanical rotation interface 55 between the first interface side 56 and the second interface side 57 via the gap 312. The first interface side and the second interface side are set up to rotate relative to each other. The first interface side 56 and the second interface side 57 are supported with respect to each other in a mechanical manner by a radial plain bearing. In the embodiment shown in FIG. 8, the radial plain bearing and the complementary plain bearing shell are formed by the first ferrule 110, the second ferrule 210 and the radial bearing sleeve 300, the first ferrule 110 and the second ferrule 210, each being set up to rotate relative to one another at least in sections within the radial bearing sleeve 300.

Figure 9:
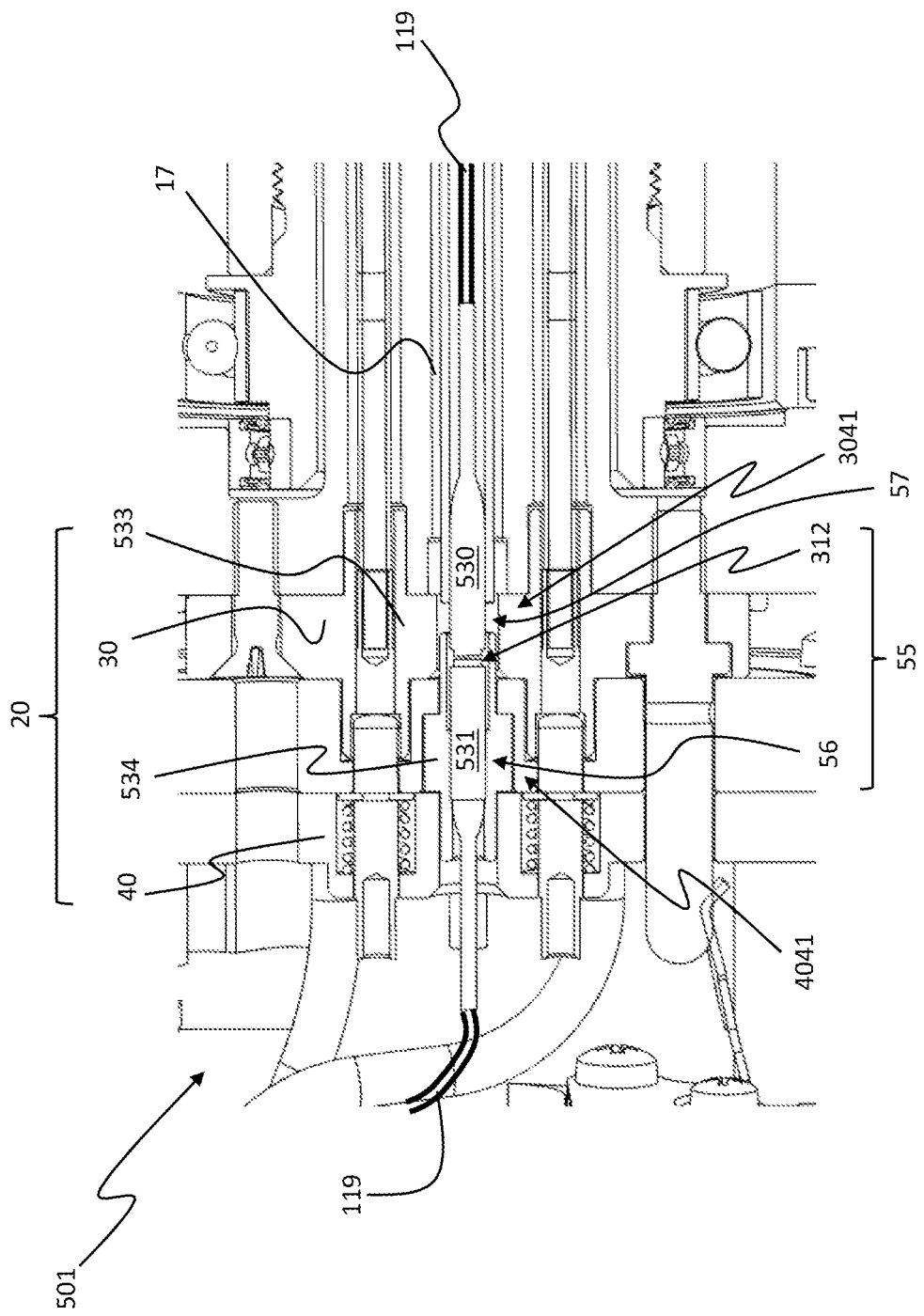
FIG. 9 shows a detailed view of a further embodiment of the signal rotation transfer device in the multifunctional rotation transfer system.

FIG. 9 shows a modified embodiment of the first optical rotation transfer device 501 according to FIG. 8. In the modified embodiment of the first optical rotation transfer device 501, lenses are used instead of ferrules.

The first signal interface device 3041 which serves as a rotary plug-in device includes radially inwardly a first lens 530 having the optical waveguide 119 of the one active arm module 5 mechanically and optically connected thereto. Radially outwardly on an outer circumferential edge of the first lens 530, a first lens receptacle 533 is arranged. The first lens receptacle 533 is fixed to the rear portion of the first lens 530 with a bonded first section. A hollow-cylindrical engagement space is embodied between a second portion of the first lens receptacle 533 adjacent to the first portion and the front part of the first lens 530. The second portion of the first lens receptacle 533 thereby protrudes in axial direction beyond the surface of the second lens 530.

The first lens receptacle 533 is further connected to the output shaft 17 in a torque-proof manner. The first lens receptacle 533 may be provided in one piece with the output shaft 17 or may be partially formed in one material piece or integrally with the output shaft 17.

The second signal interface device 4041 which serves as a rotary mating plug-in device, radially inwardly comprises a second lens 531 having the optical waveguide 119 of the further active arm module 5 mechanically and optically connected thereto. Radially outwardly on an outer circumferential edge of the second lens 531, a second lens receptacle 534 having a bound first portion is seated on the rear portion of the first lens 530. Adjacent to the first portion of the second lens receptacle 534 is a free second portion projecting from the surface of the second lens 530 in the axial direction.

In assembled arm modules 5, the free second portion of the second lens receptacle 534 is cylindrical in shape and engages the hollow-cylindrical engagement space formed between the second portion of the first lens receptacle 533 and the front part of the first lens 530 when the rotatable first connection device 30 and the housing-fixed second connection device 40 are arranged on top of each other and assembled in the manner explained in connection with FIG. 3. In this regard, the second portion of the first lens receptacle 533, with the inner surface forming the hollow-cylindrical engagement space, serves as a plain bearing shell for the radially outer surface of the second portion of the second lens receptacle 534.

In the first optical rotation transfer device 501 shown in FIG. 9, the optical signal transmission is performed from the optical waveguide 119 of the active arm module 5 via the first lens 350 of the active arm module 5, the air gap 312 between the first lens 350 of the active arm module 5 and the second lens 351 of the further active arm module 5, the second lens 531 of the further active arm module 5 to the optical waveguide 119 of the further active arm module 5.

The use of a lens system, as shown in FIG. 9, has the advantage over the setup with a ferrule system shown in FIG. 8 that optical signal transmission using lenses does not require such precise alignment of the lenses with respect to each other compared to the ferrules, which is why a radial bearing design using the lens receptacles without an additional radial bearing sleeve is sufficient.

In the embodiments shown in FIG. 8 and FIG. 9, the signal rotation transfer is performed optically using the optomechanical rotation interface 55 between the first interface side 56 and the second interface side 57 via the gap 312. Instead of an optomechanical rotation interface, another wireless rotation interface may be used for a transmission of modulated electromagnetic waves across the gap. The first interface side and the second interface side of the rotation interface then form a transmitter-receiver arrangement. Transmitter and/or receiver are selected according to the frequency range used.

For example, directional radio transmission across the gap may be used with a radio chip as the transmitter on one interface side and an antenna as the receiver on the other interface side. Alternatively, a signal transmission with a light or infrared beam may be used. A light emitting diode, a laser diode or a semiconductor laser can be used as the transmitter. Collimation may be performed with lenses as in the embodiment shown in FIG. 9. A photodiode is used as the receiver. The interface side with the transmitter and the interface side with the receiver are set up to rotate relative to each other to enable signal rotation transfer. For bidirectional signal transmission, each interface side of the rotary interface has a combined transmitter-receiver arrangement.

In the embodiments of the first signal rotation transfer device 501 explained with reference to FIG. 8 and FIG. 9, the rotation interface 55 is formed as a portion of the mechanical interface 20 between two active arm modules 5. It is possible to provide the rotation interface 55 in the active arm module 5 itself.

Figure 10:
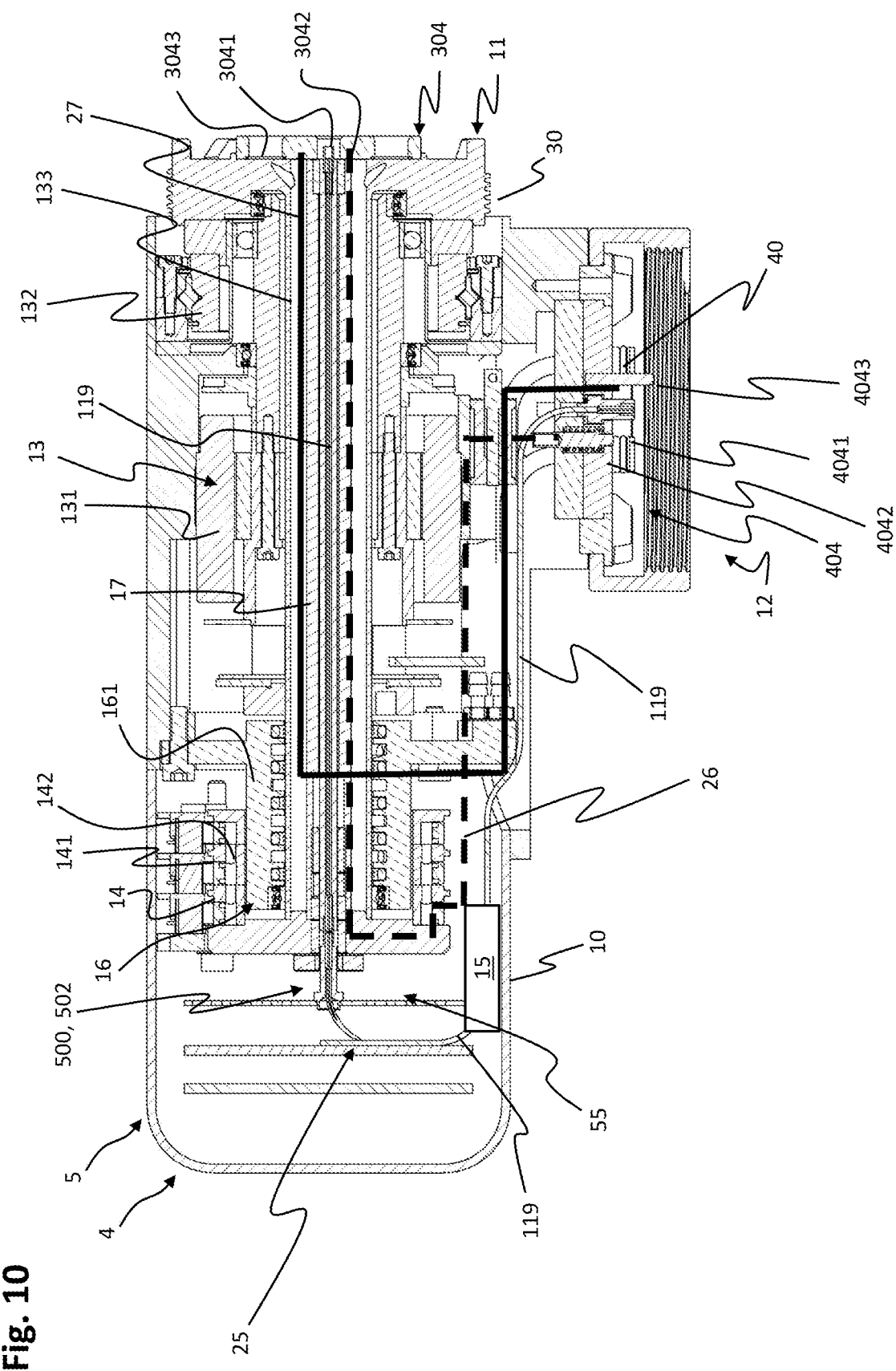
FIG. 10 depicts a sectional view of an active arm module of the industrial robot of FIG. 1, with a further embodiment of the signal rotation transfer device in the multifunctional rotation transfer system.

In a sectional view, FIG. 10 shows an active arm module 5 of the industrial robot according to FIG. 1 as an alternative to FIG. 4, with a second signal rotation transfer device 502 arranged remote from the mechanical interface 20 in the arm module 5. The active arm module 5 shown in FIG. 10 has a substantially identical structure to the active arm module shown in FIG. 3, and therefore the same reference numerals are used for the components. However, the active arm module 5 in the modified embodiment shown in FIG. 10 has a modified outer shape of the housing 10.

The optical signal path 25 extending between the first signal interface device 3041 in the first contact device 304 and the second signal interface device 4041 in the second contact device 404 is explained below with regard to the active arm module 5 in FIG. 10. The electrical path 26 and the fluid path 27 in the active arm module 5 with the associated interface devices essentially correspond to the embodiment described with reference to FIG. 4.

The mechanical transfer of rotation within the active arm module 5 in FIG. 10 takes place in the same way as in the active arm module 5 in FIG. 3. The drive device 13 rotates the first connection device 30 of the first connection side 11 of the active arm module 5, which is connected to the output shaft 17 in a torque-proof manner, against the housing 10 and thus against the second connection device 40 of the second connection side 12 fixed to the housing.

For electrical rotation transfer within the active arm module 5 in FIG. 10, the active arm module 5 comprises, between the housing 10 and the output shaft 17, the electrical slip ring device 14, which provides rotational transmission of electrical energy between the rotatable first connection device 30 of the first connection side 11 and the housing-fixed second connection device 40 of the second connection side 12. The slip ring device 14 has the electrical brush device 141 as a stator, which is connected to the housing 10 in a fixed manner, and the electrical slip contact ring device 142 as a rotor, which is arranged on the output shaft 17.

In the active arm module 5 in FIG. 10, the fluidic rotary feedthrough 16 further provides rotational transfer of fluid within the active arm module 5, with the fluid supply device 161, which is fixedly connected to the housing 10, acting as the stator and the output shaft 17 acting as the rotor.

The optical signal path 25 of the active arm module 5 in FIG. 10 is configured such that the optical waveguide 119 connects the first and second connection sides 11, 12 within the housing 10 to the transceiver 15 via the second rotation transfer device 502. The optical data transmission within the housing 10 of the active arm module 5 is performed starting from the first signal interface device 3041 in the first contact device 304 of the rotatable first connection device 30 via the optical waveguide 119, which extends in the output shaft 17, to the second rotation transfer device 502. From the second rotation transfer device 502, the optical data transmission then continues via the optical waveguide 119 to the transceiver 15 and from there via the optical waveguide 119 to the second signal interface device 4041 in the second contact device 404 of the housing-fixed second connection device 40.

Figure 11:
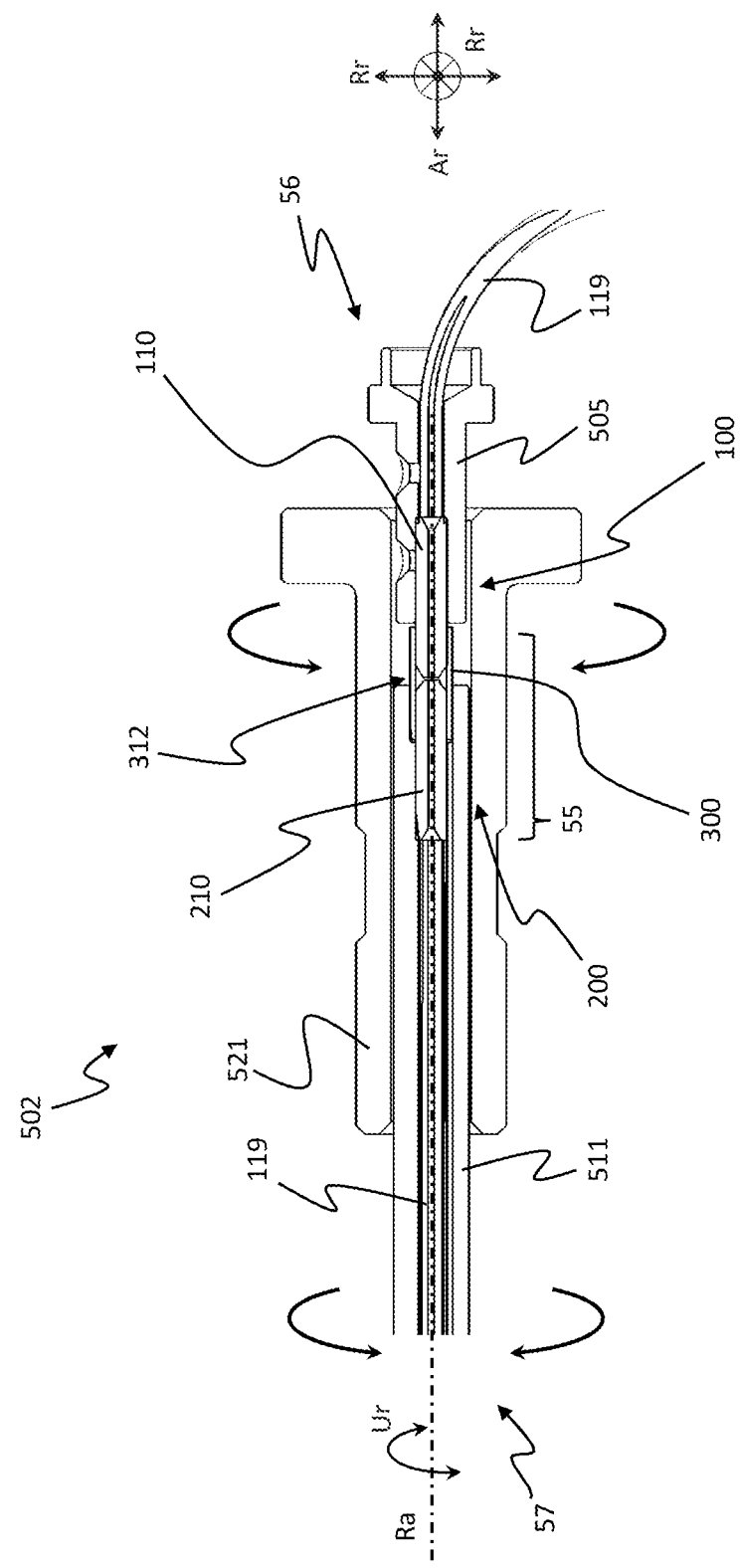
FIG. 11 is a detailed view of the rotation transfer device from FIG. 10.

The optical data transmission may be bidirectional. Instead of optical wave transmission in the optical waveguide 119, electrical signal transmission may also take place via a data cable. In the following, with reference to FIG. 11, an embodiment of the second signal rotation transfer device 502 in FIG. 10, which is shown enlarged and rotated by 180° relative to the embodiment shown in FIG. 10, is explained in more detail. The embodiment of the second signal rotation transfer device 502 in FIG. 11 is partially kinematically reversed to the embodiment of the first signal rotation transfer device 501 in FIG. 8.

The second signal rotation transfer device 502 comprises the first optomechanical interface side 56 on a stator side (on the right in FIG. 11) with a rotary plug-in device 100 provided there. Opposite in axial direction Ar, the second rotation transfer device 502 comprises the second optomechanical interface side 57 with a rotation counter-plug device 200 on a rotor side (on the left in FIG. 11).

The rotary plug-in device 100 radially internally comprises the first optical ferrule 110 with the optical waveguide 119 mechanically and optically connected to it. The first ferrule 110 is set up in a first receptacle 505, wherein a longitudinal end section of the first ferrule 110 facing away from a free longitudinal end in the axial direction Ar (to the right with reference to FIG. 11) is provided, in particular in a fixed manner, in the first receptacle 505. A portion of the first ferrule 110 extending in the axial direction Ar (to the left with reference to FIG. 11) and facing the free longitudinal end on the outside serves as a sliding bearing shell for a radially inner surface of the radial bearing sleeve 300.

In this context, the radial bearing sleeve 300 formed as a radial plain bearing is arranged radially outwardly on an outer circumferential edge of the first ferrule 110. Here, the radial bearing sleeve 300 is seated on a second ferrule 210 with a bound longitudinal end portion only and protrudes from a free longitudinal end of the first ferrule 110 in the axial direction Ar (to the right with reference to FIG. 11).

The radial bearing sleeve 300 is received in a second receptacle 511 together with a second portion of the second ferrule 210 extending therefrom in the axial direction Ar (to the left with reference to FIG. 11). The second receptacle 511 may e.g. be embodied as a tube, a sleeve, etc. In the present case, the second receptacle 511 is particularly embodied as a brass tube. The second receptacle 511 is preferably received inside of the output shaft 17 so as to be rotatable together with the output shaft 17; i.e., the first ferrule 1110 and the radial bearing sleeve 300 are fixedly arranged in the active arm module 5 relative to the housing in a fixed manner.

Here, the second receptacle 511 may be received within a central passage recess of a bearing sleeve 521 which rotatably supports the second receptacle 511 within the output shaft 17. In a region of an inner-housing free end of the output shaft 17, i.e. away from the rotatable first connection device 30, the bearing sleeve 521 may protrude from the output shaft 17 and inwardly into the housing 10. Furthermore, the second receptacle 511 may essentially extend through the output shaft 17 and have a preferably torque-proof optical further contact at an end adjacent to the rotatable connection device 30.

The second receptacle 511 may include a bore and/or a device for fixing the optical waveguide 119 of the second ferrule 210 and/or the radial bearing sleeve 300. Furthermore, an outer circumferential edge of the second ferrule 210 may, as the case may be, also function as a plain bearing shell radially within the radial bearing sleeve 300. In such a case, the radial bearing sleeve 300 may be arranged to rotate relative to the first ferrule 110. It is possible to provide the radial bearing sleeve 300 analogously on the axially opposite first ferrule 110.

A free longitudinal end section of the first ferrule 110 originating from the free longitudinal end of the first ferrule 110 and, as the case may be, a longitudinal section of the first receptacle 505 adjoining the free longitudinal end section may be advanced into the central passage recess of the bearing sleeve 521 for setting up the second optical rotation transfer device 502 at the front face away from the rotatable connection device. Here, in particular, the longitudinal end portion of the first receptacle 505 may be received or mounted, in particular slide-mounted, in the passage recess of the bearing sleeve 521.

For setting up the second signal rotation transfer device 502, the free longitudinal end of the first ferrule 110 is preferably advanced into the passage recess of the bearing sleeve 521 with the adjoining longitudinal end section of the first receptacle 505. In this case, the bearing sleeve 521 is preferably already arranged in the output shaft 17. Here, at first the free longitudinal end of the first ferrule 110 comes into mechanical contact with the radial bearing sleeve 300, the free longitudinal end being centered therein. The first ferrule 110 is then moved forward into the radial bearing sleeve 300 via the first receptacle 505 until a desired gap 312 is established.

The gap 312 is preferably again arranged as a fluid gap, in particular an air gap. The gap 312 may be secured in various ways between the longitudinal end portions of the ferrules within the radial bearing sleeve 300. The gap 312 may e.g. be ensured by the positions of the ferrules in the receptacles, the positions of which must in turn be secured with respect to the housing. The first receptacle 505 may e.g. be set up with a mechanical pre-tension with regard to the second receptacle 511 by a spring.

Instead of an optomechanical rotation interface, another wireless rotation interface for a transmission of modulated electromagnetic waves across the gap may also be used again for the signal rotation transfer in the active arm module 5. The first interface side and the second interface side of the rotation interface then form a transmitter-receiver arrangement. Transmitters or receivers are selected according to the used frequency range. For example, directional radio transmission across the gap may be used with a radio chip as the transmitter on one interface side and an antenna as the receiver on the other interface side. Alternatively, a signal transmission with a light or infrared beam may be used. A light emitting diode, a laser diode or a semiconductor laser may be used as the transmitter. The collimation may be done by lenses. A photodiode is used as the receiver. The interface side with the transmitter and the interface side with the receiver are set up to rotate against each other to enable signal rotation transfer. For bidirectional signal transmission, each interface side of the rotary interface has a combined transmitter-receiver arrangement.

Figure 12:
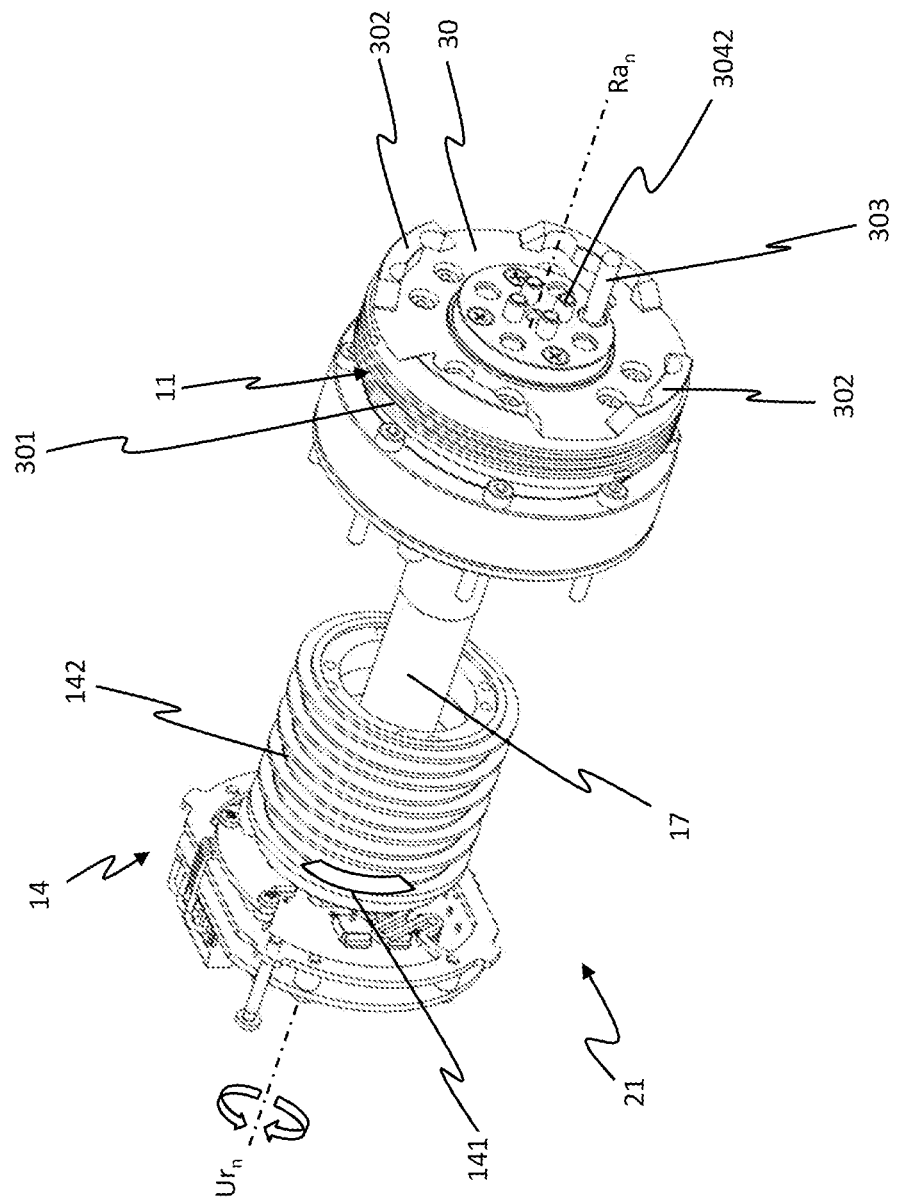
FIG. 12 is a perspective view of an embodiment of the electrical rotation transfer device in the multifunctional rotation transfer system.

FIG. 12 shows a perspective view of the main parts of the electrical slip ring device 14 of the electrical rotation transfer device 21 in the multifunctional rotation transfer system of the active arm module 5 of FIG. 3 and FIG. 4 or FIG. 10.

The capability of a rotation transfer of electricity is performed by the electrical slip ring device 14 within the active arm module 5, with the output shaft 17 acting as a section of the electrical rotation transfer on which the electrical slip contact ring device 142 of the slip ring device 14 is arranged. The slip contact ring device 142 of the slip ring device 14 is thereby set up on a longitudinal end section of the output shaft 17 opposite to the rotatable first connection device 30 and, in the embodiment shown, has five annular slip contacts. Each of the annular slip contacts of the slip contact ring device 142 is associated with an arrangement of brushes, in particular carbon brushes, of the electrical brush device 141 of the slip contact ring device 14. Only a small section of the electrical brush device 141 of the slip ring device 14, which is firmly connected to the housing 10, is shown in FIG. 12.

As shown in FIG. 4 and FIG. 10, in the active arm module 5 electricity is supplied from the second connection device 40, which is fixed to the housing, via the electrical lines to the module control unit 18 and from there on to the electrical brush device 141 of the electrical slip ring device 14. The electrical brush device 141 is arranged fixed to the housing in the arm module 5. The slip contacts of the electrical slip ring device 142 rotate with the output shaft 17 and pick up electricity from the brushes of the brush device 141. Four electrical conductors in the output shaft 17 lead from four of the slip contacts to the rotatable first connection device 30. The four electrical conductors in the output shaft 17 terminate in four electrical connection devices of the first electrical interface device 3042.

Figure 13:
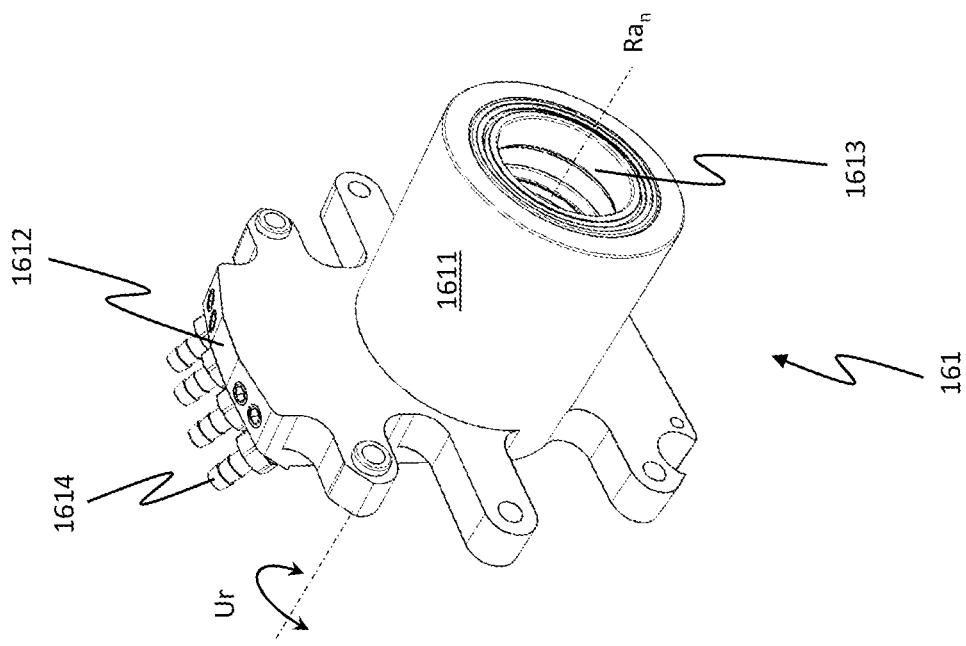
FIG. 13, in a perspective view, shows a partial section of an embodiment of the fluidic rotation transfer device in the multifunctional rotation transfer system.
Figure 14:
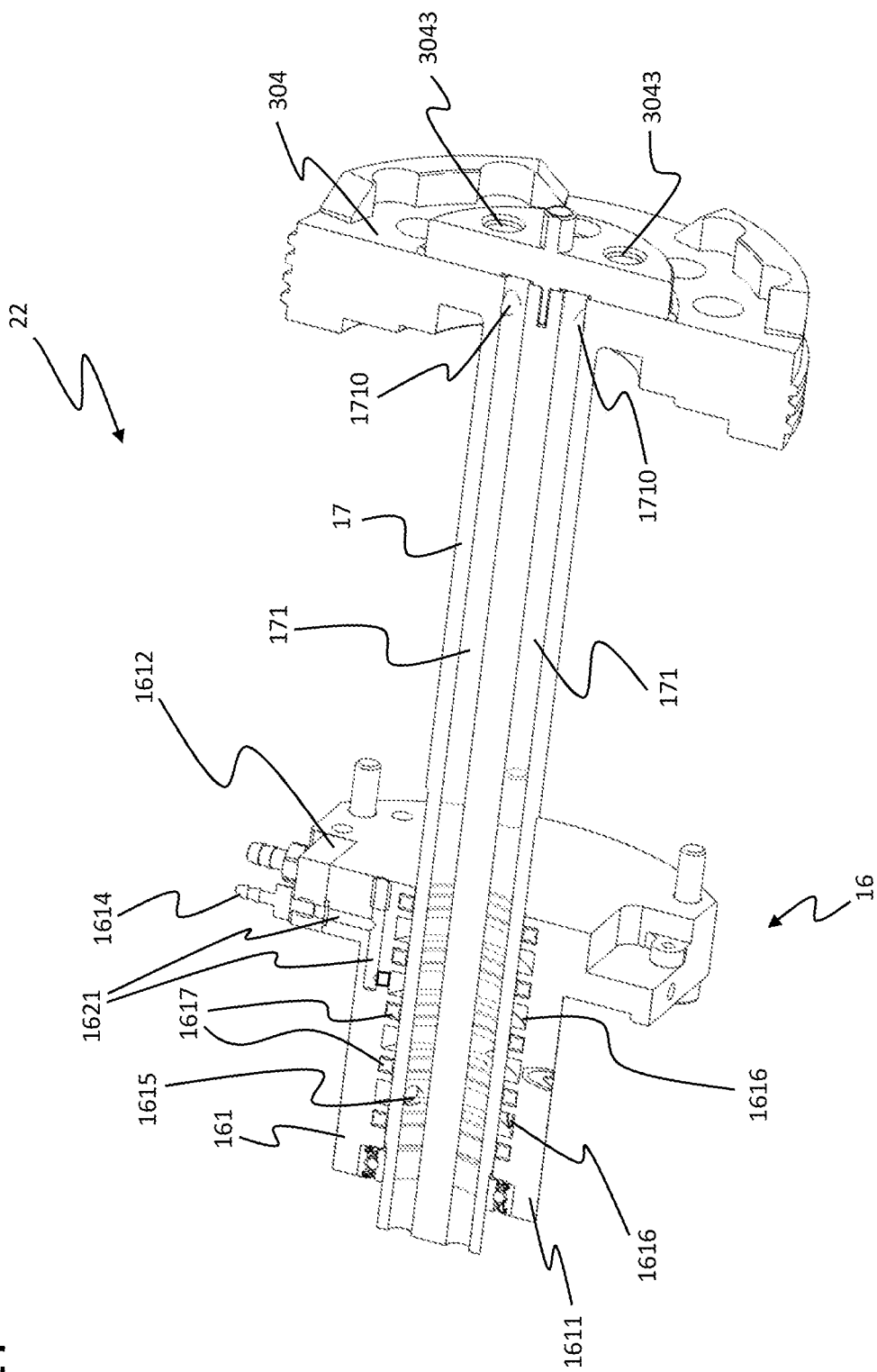
FIG. 14, in an offset sectional perspective view, shows another subsection of the embodiment of the fluidic rotation transfer device in the multifunctional rotation transfer system.

As described with respect to FIG. 4 described in detail above, the fifth slip contact of the electrical slip contact device 142, in conjunction with the fifth brush of the brush device 141, serves for electrically connecting the centering receptacle 403 of the second connection device 40 and the centering pin 303 of the first connection device 30 to provide potential equalization for the active arm module 5. FIG. 13 and FIG. 14 show the essential parts of the fluidic rotary feedthrough 16 of the fluidic rotation transfer device 22 in the multifunctional rotation transfer system of the active arm module 5 of FIG. 3 and FIG. 4 and FIG. 10, respectively. The fluidic rotary feedthrough 16 for fluid transmission within the active arm module 5 has, as a stator, the fluid supply device 161, which is fixedly connected to the housing 10, and, as a rotor, the output shaft 17, in which corresponding fluid lines 171 are formed, as already described in connection with FIG. 7.

In FIG. 13, the fluid supply device 161 is shown in a perspective view, and in FIG. 14, a part of the fluid supply device 161 and the output shaft 17 of the fluidic rotary feedthrough 16 are shown in a sectional perspective view slightly shifted backward with respect to the axis of rotation Ra, wherein the output shaft 17 is shown partially transparent for better recognition of the individual elements.

As shown in FIG. 4 and FIG. 10, fluid is guided from the second connection device 40, which is fixed to the housing, to the fluidic rotary feedthrough 16 via four fluid transport lines. The rotary feedthrough 16 then transfers fluid transported through the fluid transport lines to four fluid lines 171 provided in the output shaft 17, which open into a corresponding number of fluid connection lines 1710 and then into a corresponding number of fluid plug-in connection devices of the first fluidic interface device 3043 in the rotatable first connection device 30.

The fluid supply device 161 shown in FIG. 13 has an annular housing 1611 with a fluid transfer flange 1612 and a fluid transfer section 1613 connected thereto in the axial direction. The fluid transfer flange 1612 has four outer fluid connections 1614, by which the fluid may be supplied to the fluid supply device 161 from the fluid transport lines. Starting from each of the outer fluid connections 1614, the fluid transfer flange 1612 has an internal connecting fluid channel 1621 (see FIG. 14) in the annular housing 1611, which extends into the fluid transfer section 1613.

In the fluid transfer section 1613, the internal four connecting fluid channels 1621 each terminate radially at a corresponding circumferential fluid channel 1616 formed internally in the fluid transfer section 1613, which is established in a hollow-cylindrical portion within the fluid transfer section 1613. FIG. 14 shows a cross-sectional view of the hollow-cylindrical portion of the fluid transfer section 1613, wherein the internal four connecting fluid channels 1621 each form a bore terminating in the corresponding circumferential fluid channels 1616 formed as fully circumferential internal and internally open circumferential grooves. The circumferential fluid channels 1616 are preferably sealed from one another in the hollow-cylindrical portion of the fluid transfer section 1613 by seals 1617. Alternatively, the seals may be set on the outside of the output shaft 17, e.g. in outer circumferential grooves.

The output shaft 17 has four fluid lines 171, each of which has a fluid line via hole 1615 in the region of the circumferential fluid channels 1616 associated with the respective fluid lines 171. Thus, the fluid located in a circumferential fluid channel 1616 may be transferred through the fluid passage hole 1615 into the respective fluid line 171 of the output shaft 17. As previously described in connection with FIG. 7, the four fluid lines 171 open into four fluid connection lines 1710 formed in the first connection device 30, which open into four fluid plug-connection devices that are parts of the first fluid interface 3043 of the rotatable first connection device 30.

It is of course also possible to set up a fluid flow direction in the active arm module 5 in reverse. Furthermore, the circumferential fluid channels may also be formed in the output shaft 17 instead of in the fluidic fluid supply device 161.

The invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of Reference Numerals: 1-305 | |
| --- | --- |
| 1 | robot base |
| 2 | robot arm |
| 4 | arm module |
| 5 | active arm module |
| 5.1 | first active arm module |
| 5.2 | second active arm module |
| 5.3 | third active arm module |
| 5.4 | fourth active arm module |
| 5.5 | fifth active arm module |
| 5.6 | sixth active arm module |
| 6 | passive arm module |
| 6.1 | first passive arm module |
| 6.2 | second passive arm module |
| 7 | distal robot arm end |
| 10 | housing |
| 11 | first connection side |
| 12 | second connection side |
| 13 | drive device |
| 14 | electrical slip ring device |
| 15 | transceiver |
| 16 | rotary feedthrough |
| 17 | output shaft |
| 18 | module control unit |
| 19 | shaft assembly |
| 20 | mechanical interface |
| 21 | electrical rotation transfer device |
| 22 | fluidic rotation transfer device |
| 25 | optical signal path |
| 26 | electrical path |
| 27 | fluid path |
| 30 | first connection device |
| 40 | second connection device |
| 55 | rotation interface |
| 56 | first interface side |
| 57 | second interface side |
| 100 | rotary plug-in device |
| 110 | first ferrule |

TABLE 1-continued

| List of Reference Numerals: 1-305 | |
| --- | --- |
| 119 | optical waveguide |
| 131 | electrical motor |
| 132 | gear device |
| 133 | hollow shaft |
| 141 | brush device |
| 142 | slip contact ring device |
| 161 | fluid supply device |
| 171 | output shaft fluid line |
| 210 | second ferrule |
| 300 | radial bearing sleeve |
| 301 | external thread |
| 302 | first spur toothing |
| 303 | centering pin |
| 304 | first contact device |
| 305 | first mechanical connection elements |

TABLE 2

| List of Reference Numerals: 401-4043 | |
| --- | --- |
| 401 | fastening ring |
| 402 | second spur toothing |
| 403 | centering receptacle |
| 404 | second contact device |
| 405 | second mechanical connection elements |
| 500 | optical rotation transfer device |
| 501 | first optical rotation transfer device |
| 502 | second optical rotation transfer device |
| 504 | first receptacle (first optical rotation transfer device) |
| 505 | first receptacle (second optical rotation transfer device) |
| 510 | second receptacle (first optical rotation transfer device) |
| 511 | second receptacle (second optical rotation transfer device) |
| 513 | spring |
| 521 | bearing sleeve |
| 530 | first lens |
| 531 | second lens |
| 533 | first lens receptacle |
| 534 | second lens receptacle |
| 1611 | annular housing |
| 1612 | fluid transfer flange |
| 1613 | fluid transfer section |
| 1614 | fluid connection |
| 1615 | fluid line via hole |
| 1616 | circumferential fluid channel (fluid supply device) |
| 1617 | seal |
| 1621 | connecting fluid channel |
| 1710 | fluid connection line |
| 3041 | first optical interface device |
| 3042 | first electrical interface device |
| 3043 | first fluidic interface device |
| 4041 | second optical interface device |
| 4042 | second electrical interface device |
| 4043 | second fluidic interface device |

The invention claimed is:

1. An arm module for a modular robot arm of an industrial robot, comprising:

a housing having a first connection side and a second connection side, the first connection side being configured to be controllably rotatable about an axis of rotation relative to the second connection side, the first connection side having a rotatable first connection device and the second connection side having a second connection device fixed to the housing, a multifunctional rotation transfer system configured for rotational transfer of data signals, electrical energy and fluid, and a drive device with a shaft assembly having an output shaft, the shaft assembly being connected in a rotationally fixed manner to the rotatable first connection device of the first connection side, the shaft assembly forming a section of the multifunctional rotation transfer system, wherein the multifunctional rotation transfer system comprises an electrical rotation transfer device and a fluidic rotation transfer device, the electrical rotation transfer device and the fluidic rotation transfer device being arranged with the fluidic rotation transfer device placed at least partially within the electrical rotation transfer device, wherein a fluid supply device of the fluidic rotation transfer device configured for serving as a stator protrudes with a fluid transfer section of an annular housing into a space between a slip contact ring device of the electrical rotation transfer device, which is configured for serving as a rotor, and the output shaft, and wherein the fluid transfer section of the annular housing of the fluidic rotation transfer device is further configured for serving as a rotational bearing for the slip contact ring device of the electrical rotation transfer device.

2. The arm module according to claim 1, wherein the drive device comprises an electric motor and a gear device, wherein the electric motor is configured to drive a hollow shaft of the shaft assembly as an input shaft of the gear device at an output speed, wherein an output of the gear device is connected in a rotationally fixed manner to the output shaft.

3. The arm module according to claim 2, wherein the output shaft extends from the rotatable first connection device in the hollow shaft through the gear device, the electric motor, a fluidic rotary feedthrough and an electrical slip ring device, wherein a first bearing of the output shaft in a region of the rotatable first connection device is provided by a bearing on the hollow shaft and a second bearing of the output shaft is provided by a fluid supply device of the fluidic rotary feedthrough.

4. The arm module according to claim 1, wherein the rotatable first connection device of the first connection side comprises a first contact device having a first signal interface device, a first electrical interface device and a first fluidic interface device, and the second connection device of the second connection side attached to the housing comprises a second contact device having a second signal interface device, a second electrical interface device and a second fluidic interface device, the first signal interface device and the second signal interface device, the first electrical interface device and the second electrical interface device and the first fluidic interface device and the second fluidic interface device being configured to be complementary to each other.

5. The arm module according to claim 4, wherein the rotatable first connection device comprises first mechanical connection elements and the second connection device comprises second mechanical connection elements, wherein the first mechanical connection elements and the second mechanical connection elements are configured complementary to each other, and wherein the first contact device is arranged radially inside of the first mechanical connection elements and the second contact device is arranged radially inside the second mechanical connection elements.

6. The arm module according to claim 4, wherein the first connection side has the axis of rotation defined to be controllably rotatable relative to the second connection side and the second connection side has an axis of rotation defined to be controllably rotatable relative to the first connection side, wherein the first signal interface device is arranged on the axis of rotation of the first connection side and the second signal interface device is arranged on the axis of rotation of the second connection side, and wherein the first electrical interface device and the first fluidic interface device and/or the second electrical interface device and the second fluidic interface device are arranged radially outside of the axis of rotation of the first connection side and outside of the axis of rotation of the second connection side, respectively.

7. An industrial robot comprising a modular robot arm having a plurality of arm modules according to claim 1.

8. An arm module for a modular robot arm of an industrial robot comprising:
a housing having a first connection side and a second connection side, the first connection side being configured to be controllably rotatable about an axis of rotation relative to the second connection side, the first connection side having a rotatable first connection device and the second connection side having a second connection device fixed to the housing,
a multifunctional rotation transfer system configured for rotational transfer of data signals, electrical energy and fluid, and
a drive device with a shaft assembly having an output shaft, the shaft assembly being connected in a rotationally fixed manner to the rotatable first connection device of the first connection side, the shaft assembly forming a section of the multifunctional rotation transfer system,
wherein said multifunctional rotation transfer system comprises an electrical rotation transfer device and a fluidic rotation transfer device, said electrical rotation transfer device having an electrical slip ring device including a brush device having brushes and a slip contact ring device having slip contacts, said brush device being fixedly connected to the housing, said slip contact ring device being disposed on said output shaft of said shaft assembly at a longitudinal end section of the output shaft opposite to the rotatable first connection device such that said slip contacts of said electrical slip ring device co-rotate with said output shaft and tap electricity from the associated brushes of said brush device,
wherein the fluidic rotation transfer device comprises a fluidic rotation passage having a fluid supply device having circumferential fluid channels configured as a stator and fluid lines arranged within the output shaft as a rotor, wherein the fluid supply device comprises an annular housing having a fluid transfer flange and a fluid transfer section with the circumferential fluid channels adjacent thereto in an axial direction, the fluid supply device being fixedly connected to the housing, wherein the fluid lines arranged in the output shaft each have a fluid line through hole associated with a respective one of said circumferential fluid channels, and thus configured for the fluid to be transferred between the respective circumferential fluid channels and fluid lines, and
wherein the fluid supply device of a rotary fluidic feedthrough configured for serving as the stator protrudes with the fluid transfer section of the annular housing into a space between the slip contact ring device of the electrical slip ring device, which is configured for serving as the rotor, and the output shaft, wherein the fluid transfer section of the annular housing of the rotary fluidic feedthrough is further configured to serve as a rotational bearing for the electrical slip ring device.

9. The arm module according to claim 8, wherein the fluid supply device has the annular housing with the fluid transfer flange and fluid transfer section adjoining thereto in the axial direction, wherein the fluid transfer flange comprises fluid connections configured for supplying the fluid to the fluid supply device from the fluid transport lines, wherein an inner connecting fluid channel extends from each of the fluid connections into the fluid transfer section and ends radially at an associated one of said circumferential fluid channels, formed inside of the fluid transfer section.

10. The arm module according to claim 9, wherein the drive device comprises an electric motor and a gear device, wherein the electric motor is configured to drive a hollow shaft of the shaft assembly as an input shaft of the gear device at an output speed, wherein an output of the gear device is connected in a rotationally fixed manner to the output shaft.

11. The arm module according to claim 10, wherein the output shaft extends from the rotatable first connection device in the hollow shaft through the gear device, the electric motor, a fluidic rotary feedthrough and the electrical slip ring device, wherein a first bearing of the output shaft in a region of the rotatable first connection device is provided by a bearing on the hollow shaft and a second bearing of the output shaft is provided by the fluid supply device of the fluidic rotary feedthrough.

12. The arm module according to claim 8, wherein the rotatable first connection device of the first connection side comprises a first contact device having a first signal interface device, a first electrical interface device and a first fluidic interface device, and the second connection device of the second connection side attached to the housing comprises a second contact device having a second signal interface device, a second electrical interface device and a second fluidic interface device, the first signal interface device and the second signal interface device, the first electrical interface device and the second electrical interface device and the first fluidic interface device and the second fluidic interface device being configured to be complementary to each other.

13. The arm module according to claim 12, wherein the rotatable first connection device comprises first mechanical connection elements and the second connection device comprises second mechanical connection elements, wherein the first mechanical connection elements and the second mechanical connection elements are configured complementary to each other, and wherein the first contact device is arranged radially inside of the first mechanical connection elements and the second contact device is arranged radially inside the second mechanical connection elements.

14. The arm module according to claim 13, wherein the first connection side has the axis of rotation defined to be controllably rotatable relative to the second connection side and the second connection side has an axis of rotation defined to be controllably rotatable relative to the first connection side, wherein the first signal interface device is arranged on the axis of rotation of the first connection side and the second signal interface device is arranged on the axis of rotation of the second connection side, and wherein the first electrical interface device and the first fluidic interface device and/or the second electrical interface device and the second fluidic interface device are arranged radially outside of the axis of rotation of the first connection side and outside of the axis of rotation of the second connection side, respectively.

15. An industrial robot comprising a modular robot arm having a plurality of arm modules according to claim 8.

16. An industrial robot comprising a multifunctional rotation transfer system configured for rotational transfer of data signals, electrical energy and fluid, comprising:
an arm module for a modular robot arm of the industrial robot, including:
a housing having a first connection side and a second connection side, the first connection side being configured to be controllably rotatable about an axis of rotation relative to the second connection side, the first connection side having a rotatable first connection device and the second connection side having a second connection device fixed to the housing, and
a drive device with a shaft assembly having an output shaft, the shaft assembly being connected in a rotationally fixed manner to the rotatable first connection device of the first connection side, the shaft assembly forming a section of the multifunctional rotation transfer system;
the multifunctional rotation transfer system comprising an electrical rotation transfer device and a fluidic rotation transfer device, the electrical rotation transfer device and the fluidic rotation transfer device being arranged with the fluidic rotation transfer device placed at least partially within the electrical rotation transfer device,
with the fluidic rotation transfer device serving as a rotational bearing for the electrical rotation transfer device, said electrical rotation transfer device having an electrical slip ring device including a brush device having brushes and a slip contact ring device having slip contacts, said slip contact ring device being disposed on said output shaft of said shaft assembly such that said slip contacts of said slip contact ring device co-rotate with said output shaft and tap electricity from the associated brushes of said brush device,
wherein the fluidic rotation transfer device further comprises a fluidic rotation passage having a fluid supply device having circumferential fluid channels, and the longitudinal passage recess of the fluid path within the output shaft is formed as fluid lines, wherein the fluid lines each have a fluid line through hole associated with a respective one of said circumferential fluid channels, and thus configured for the fluid to be transferred between the respective circumferential fluid channels and fluid lines, and
wherein the fluid supply device of a rotary fluidic feedthrough is arranged at least partially within the electrical slip ring device, wherein the fluid supply device is configured for serving as a stator and protrudes with a fluid transfer section of an annular housing into a space between the slip contact ring device of the electrical rotation transfer device, which is configured for serving as a rotor, and the output shaft.

17. The industrial robot according to claim 16, wherein the fluid supply device has the annular housing with a fluid transfer flange and a fluid transfer section adjoining thereto in an axial direction, wherein the fluid transfer flange comprises fluid connections configured for supplying the fluid to the fluid supply device from the fluid transport lines, wherein an inner connecting fluid channel extends from each of the fluid connections into the fluid transfer section and ends radially at an associated one of said circumferential fluid channels, formed inside of the fluid transfer section.

* * * * *